(12) United States Patent
Tuchscherer et al.

(10) Patent No.: US 10,967,946 B1
(45) Date of Patent: *Apr. 6, 2021

(54) SYSTEMS AND METHODS FOR MOUNTING A PROPULSION DEVICE WITH RESPECT TO A MARINE VESSEL

(71) Applicant: Brunswick Corporation, Mettawa, IL (US)

(72) Inventors: Andrew Tuchscherer, Wauwatosa, WI (US); Jeffrey C. Etapa, Oakfield, WI (US)

(73) Assignee: Brunswick Corporation, Mettawa, IL (US)

( * ) Notice: Subject to any disclaimer, the term of this patent is extended or adjusted under 35 U.S.C. 154(b) by 652 days.

This patent is subject to a terminal disclaimer.

(21) Appl. No.: 15/721,117

(22) Filed: Sep. 29, 2017

Related U.S. Application Data

(63) Continuation-in-part of application No. 15/483,214, filed on Apr. 10, 2017, now Pat. No. 9,802,688.
(Continued)

(51) Int. Cl.
*B63H 21/30* (2006.01)
*B63H 20/06* (2006.01)
(Continued)

(52) U.S. Cl.
CPC .............. *B63H 20/06* (2013.01); *B63J 99/00* (2013.01); *F16F 9/535* (2013.01); *F16F 15/005* (2013.01); *B63B 79/00* (2020.01); *B63H 21/302* (2013.01)

(58) Field of Classification Search
CPC . F16F 9/532; F16F 9/535; F16F 9/537; B63H 21/30; B63H 21/302; B63H 21/305; B63H 2021/307
See application file for complete search history.

(56) References Cited

U.S. PATENT DOCUMENTS 4,050,359 A  9/1977  Mayer
4,872,857 A  10/1989 Newman et al.
(Continued)

FOREIGN PATENT DOCUMENTS

EP   1803961     2/2011
EP   2113681     10/2011
WO   1996/33356  10/1996

OTHER PUBLICATIONS

U.S. Appl. No. 13/688,109, filed Nov. 28, 2012.
U.S. Appl. No. 14/594,228, filed Jan. 12, 2015.

*Primary Examiner* — Andrew Polay
(74) *Attorney, Agent, or Firm* — Andrus Intellectual Property Law, LLP

(57) ABSTRACT

A system comprises an elastic mount configured to support a propulsion device with respect to a marine vessel. The elastic mount contains an electromagnetic fluid. An electromagnet is configured so that increasing an amount of electricity applied to the electromagnet increases the shear strength of the electromagnetic fluid in the elastic mount and thereby decreases elasticity of the elastic mount, and so that decreasing the amount of electricity applied to the electromagnet decreases the shear strength of the electromagnetic fluid in the elastic mount and thereby increases the elasticity of the elastic mount. A controller automatically adapts the amount of electricity applied to the electromagnet based on one or more sensed conditions so as to improve performance and/or handling of the marine vessel.

20 Claims, 19 Drawing Sheets

Related U.S. Application Data which is a continuation-in-part of application No. 14/573,347, filed on Dec. 17, 2014, now abandoned.

(51) Int. Cl.
*B63J 99/00* (2009.01)
*F16F 9/53* (2006.01)
*F16F 15/00* (2006.01)
*B63B 79/00* (2020.01)

(56) References Cited

U.S. PATENT DOCUMENTS

| | | |
|---|---|---|
| 4,893,800 A | 1/1990 | Tabata |
| 4,925,414 A | 5/1990 | Newman |
| 5,236,182 A | 8/1993 | Aoki |
| 5,707,263 A | 1/1998 | Eick et al. |
| 5,974,856 A | 11/1999 | Elie |
| 5,996,745 A | 12/1999 | Jones, Jr. et al. |
| 6,176,170 B1 | 1/2001 | Uppgard et al. |
| 6,183,321 B1 | 2/2001 | Alby et al. |
| 6,273,771 B1 | 8/2001 | Buckley et al. |
| 6,322,404 B1 | 11/2001 | Magee et al. |
| 6,419,534 B1 | 7/2002 | Helsel et al. |
| 6,830,492 B1 | 12/2004 | Magee et al. |
| 6,919,534 B2 | 7/2005 | Komai et al. |
| 6,929,518 B1 | 8/2005 | Sawyer et al. |
| 6,942,530 B1 | 9/2005 | Hall et al. |
| 7,156,709 B1 | 1/2007 | Staerzl et al. |
| 7,244,152 B1 | 7/2007 | Uppgard |
| 7,896,304 B1 | 3/2011 | Eichinger et al. |
| 7,942,711 B1 | 5/2011 | Swan |
| 8,113,892 B1 | 2/2012 | Gable et al. |
| 8,935,047 B2 * | 1/2015 | Sekiya ............... B60G 17/018 701/37 |
| 9,205,906 B1 | 12/2015 | Eichinger |
| 9,481,434 B1 | 11/2016 | Eichinger et al. |
| 9,802,688 B1 * | 10/2017 | Tuchscherer .......... B63H 20/10 |
| 2002/0171186 A1 | 11/2002 | Baudendistel |
| 2003/0025255 A1 | 2/2003 | Gade |
| 2009/0276098 A1 | 11/2009 | Bodie et al. |

\* cited by examiner

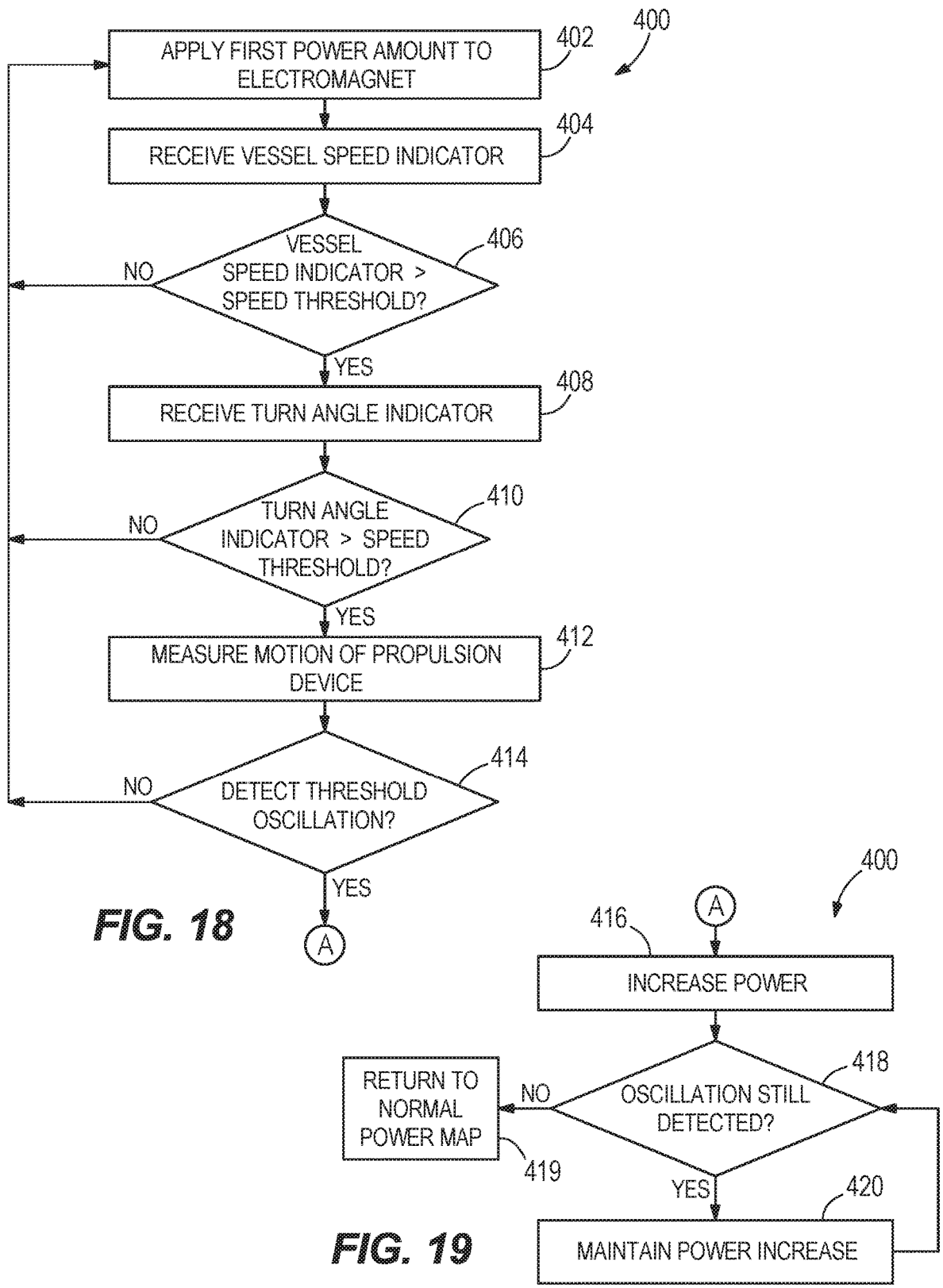

SYSTEMS AND METHODS FOR MOUNTING A PROPULSION DEVICE WITH RESPECT TO A MARINE VESSEL

CROSS REFERENCE TO RELATED APPLICATION

This application is a continuation-in-part of U.S. patent application Ser. No. 15/483,214 filed Apr. 10, 2017, which is a continuation-in-part of U.S. patent application Ser. No. 14/573,347 filed Dec. 17, 2014, which are both incorporated herein by reference in their entireties.

FIELD

The present disclosure relates to propulsion systems for marine vessels and more particularly to systems and methods for mounting a propulsion device with respect to a marine vessel.

BACKGROUND

The following U.S. patents are incorporated herein by reference in entirety:

U.S. Pat. No. 9,598,160 discloses a system and method control a trim device that positions a trimmable marine apparatus with respect to a marine vessel. A trim system is operated in an automatic mode, in which a controller sends signals to actuate the trim device automatically as a function of vessel or engine speed, or a manual mode, in which the controller sends signals to actuate the trim device in response to commands from an operator input device. An operating speed of the propulsion system is determined. When the operating speed has crossed a given operating speed threshold, the trim system is subsequently operated in the automatic or manual mode depending on whether the operating speed increased or decreased as it crossed the operating speed threshold and whether the trim system was operating in the automatic or manual mode as the operating speed crossed the operating speed threshold.

U.S. Pat. No. 9,481,434 discloses a mid-section housing for an outboard motor that includes a driveshaft housing having an oil sump. An adapter plate is coupled to a top of the driveshaft housing. The adapter plate has an inner surface along which oil from an engine mounted on the adapter plate drains into the oil sump. First and second pockets are formed in an outer surface of the adapter plate on first and second generally opposite sides thereof, the first and second pockets configured to receive first and second mounts therein. A water jacket is formed between the inner and outer surfaces of the adapter plate. The water jacket extends at least partway between the inner surface of the adapter plate and each of the first and second pockets, respectively.

U.S. Pat. No. 9,205,906 discloses a mounting arrangement for supporting an outboard motor with respect to a marine vessel extending in a fore-aft plane. The mounting arrangement comprises first and second mounts that each have an outer shell, an inner wedge concentrically disposed in the outer shell, and an elastomeric spacer between the outer shell and the inner wedge. Each of the first and second mounts extend along an axial direction, along a vertical direction that is perpendicular to the axial direction, and along a horizontal direction that is perpendicular to the axial direction and perpendicular to the vertical direction. The inner wedges of the first and second mounts both have a non-circular shape when viewed in a cross-section taken perpendicular to the axial direction. The non-circular shape comprises a first outer surface that extends transversely at an angle to the horizontal and vertical directions. The non-circular shape comprises a second outer surface that extends transversely at a different, second angle to the horizontal and vertical directions.

U.S. Pat. No. 7,896,304 discloses a support system for an outboard motor. The support system has mounts which are configured and positioned to result in an elastic center point being located closely to a roll axis of the outboard motor which is generally vertical and extends through a center of gravity of the outboard motor. The mounts are positioned so that lines which are perpendicular to their respective center lines intersect at an angle which can be generally equal to ninety degrees. The mounts are positioned in non-interfering relationship with the exhaust components of the outboard motor and its oil sump.

U.S. Pat. No. 7,244,152 discloses an adapter system as a transition structure which allows a relatively conventional outboard motor to be mounted to a pedestal which provides a generally stationary vertical steering axis. An intermediate member is connectable to a transom mount structure having a connector adapted for mounts with central axes generally perpendicular to a plane of symmetry of the marine vessel. Many types of outboard motors have mounts that are generally perpendicular to this configuration. The intermediate member provides a suitable transition structure which accommodates both of these configurations and allows the conventionally mounted outboard motor to be supported, steered, and tilted by a transom mount structure having the stationary vertical steering axis and pedestal-type configuration.

U.S. Pat. No. 6,942,530 discloses an engine control strategy for a marine propulsion system that selects a desired idle speed for use during a shift event based on boat speed and engine temperature. In order to change the engine operating speed to the desired idle speed during the shift event, ignition timing is altered and the status of an idle air control valve is changed. These changes to the ignition timing and the idle air control valve are made in order to achieve the desired engine idle speed during the shift event. The idle speed during the shift event is selected so that the impact shock and resulting noise of the shift event can be decreased without causing the engine to stall.

U.S. Pat. No. 6,929,518 discloses a shifting apparatus for a propulsion device that incorporates a magneto-elastic elastic sensor which responds to torque exerted on the shift shaft of the gear shift mechanism. The torque on the shift shaft induces stress which changes the magnetic characteristics of the shift shaft material and, in turn, allows the magneto-elastic sensor to provide appropriate output signals representative of the torque exerted on the shift shaft. This allows a microprocessor to respond to the onset of a shifting procedure rather than having to wait for actual physical movement of the components of the shifting device.

U.S. Pat. No. 6,419,534 discloses a support system for an outboard motor which uses four connectors attached to a support structure and to an engine system for isolating vibration from being transmitted to the marine vessel to which the outboard is attached. Each connector comprises an elastomeric portion for the purpose of isolating the vibration. Furthermore, the four connectors are disposed in a common plane which is generally perpendicular to a central axis of a driveshaft of the outboard motor. Although precise perpendicularity with the driveshaft axis is not required, it has been determined that if the plane extending through the connectors is within forty-five degrees of perpendicularity with the driveshaft axis, improved vibration isolation can be achieved. A support structure, or support saddle, completely surrounds the engine system in the plane of the connectors. All of the support of the outboard motor is provided by the connectors within the plane, with no additional support provided at a lower position on the outboard motor driveshaft housing.

U.S. Pat. No. 6,322,404 discloses a Hall-Effect rotational position sensor mounted on a pivotable member of a marine propulsion system and a rotatable portion of the rotational position sensor attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus. A bus access manager, such as a CAN Kingdom network, is connected in signal communication with the controller to regulate the incorporation of additional devices to the plurality of devices in signal communication with the bus. The controller is connected in signal communication with each of the plurality of devices on the communication bus. The input and output devices can each transmit messages to the serial communication bus for receipt by other devices.

U.S. Pat. No. 4,893,800 discloses a power unit mount that includes a housing in which first and second electrode bodies are suspended and which is filled with a fluid which exhibits a change in viscosity when a voltage is applied there across. The control of the voltage application is determined by a control circuit which is operatively connected to a plurality of sensors which include an engine speed sensor, a road wheel speed sensor, a relative displacement sensor and an absolute displacement sensor. A variant includes a solenoid powered vibration generator which can be energized under predetermined conditions in a manner to improve vibration attenuation.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure arose during continuing research and development of mounts, mounting arrangements and methods of making mounting arrangements for supporting propulsion devices such as outboard motors with respect to marine vessels. In certain examples, a system is for supporting a propulsion device with respect to a marine vessel. The system comprises an elastic mount configured to support the propulsion device with respect to the marine vessel. The elastic mount contains an electromagnetic fluid. An electromagnet is configured so that increasing an amount of electricity applied to the electromagnet increases the shear strength of the electromagnetic fluid in the elastic mount and thereby decreases elasticity of the elastic mount. The electromagnet is further configured so that decreasing the amount of electricity applied to the electromagnet decreases the shear strength of the electromagnetic fluid in the elastic mount and thereby increases the elasticity of the elastic mount.

A controller automatically adapts the amount of electricity applied to the electromagnet based on one or more sensed conditions so as to improve performance and/or handling of the marine vessel. In one example, the controller increases the amount of electricity applied to the electromagnet so as to reduce oscillation of the propulsion device resulting from hydrodynamic loading. In another example, the controller increases the amount of electricity applied to the electromagnet during rapid deceleration of the marine vessel so as to decrease the likelihood of hooking. In another example, the controller decreases the amount of electricity applied to the electromagnet during a rapid acceleration of the marine vessel so as to increase the elasticity of the elastic mount to allow further trim-in of the propulsion device. Corresponding methods are disclosed herein.

BRIEF DESCRIPTION OF THE DRAWINGS

The present disclosure is described with reference to the following figures. The same numbers are used throughout the figures to reference like features and like components.

FIGS. 18-23 depict various embodiments of methods, or portions thereof, for controlling an elastic mount configured to support a propulsion device with respect to a marine vessel.

DETAILED DESCRIPTION OF THE DRAWINGS

Figure 1:
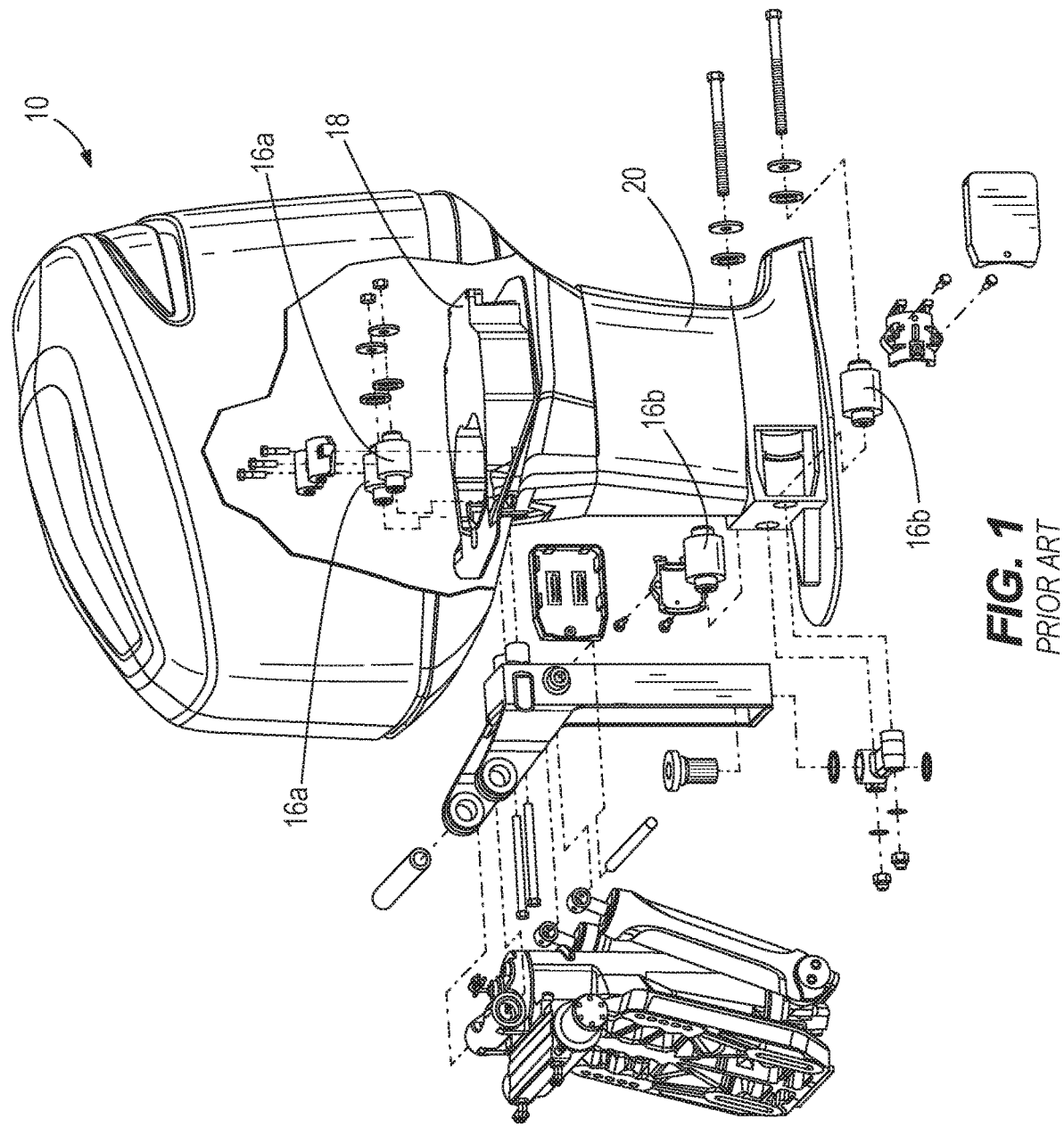
FIG. 1 is taken from U.S. Pat. No. 7,244,152 and is a perspective view of a prior art propulsion device and prior art mounting devices for mounting the propulsion device to a marine vessel.

FIG. 1 is taken from the incorporated U.S. Pat. No. 7,244,152 and depicts an arrangement for mounting a propulsion device 10 to a marine vessel via a support bracket 14, which is commonly referred to in the art as a transom bracket. Details regarding the conventional transom bracket are provided in the '152 patent. As is conventional, a plurality of elastic mounts 16a-16b are disposed between connection points of the propulsion device 10 and marine vessel, including at an adapter plate 18 (see 16*a*) and at a drive shaft housing 20 (see 16*b*) of the propulsion device 10.

Through research and development, the present inventors have endeavored to provide propulsion systems for marine vessels having improved noise, vibration and harshness characteristics. Also, the present inventors have endeavored to provide a marine propulsion system having increased power, speed, and acceleration, improved handling and tighter transom packaging. Through such research and development, the present inventors found that current elastomeric mounts have functional limitations that force engineering compromises regarding overall package size, layout, engine design, and noise, vibration and harshness characteristics. Also, the inventors found that prior art mounts typically are designed for an entire family of propulsion devices having similar characteristics and typically are not adjustable or vessel-specific. During research and development, the present inventors determined that it would be desirable to provide systems and methods that semi-actively and/or actively adapt the elasticity of the mounts based upon current characteristics and/or conditions of the propulsion device and/or marine vessel to thereby actively and/or semi-actively control displacement of the propulsion device during marine vessel travel.

Figure 2:
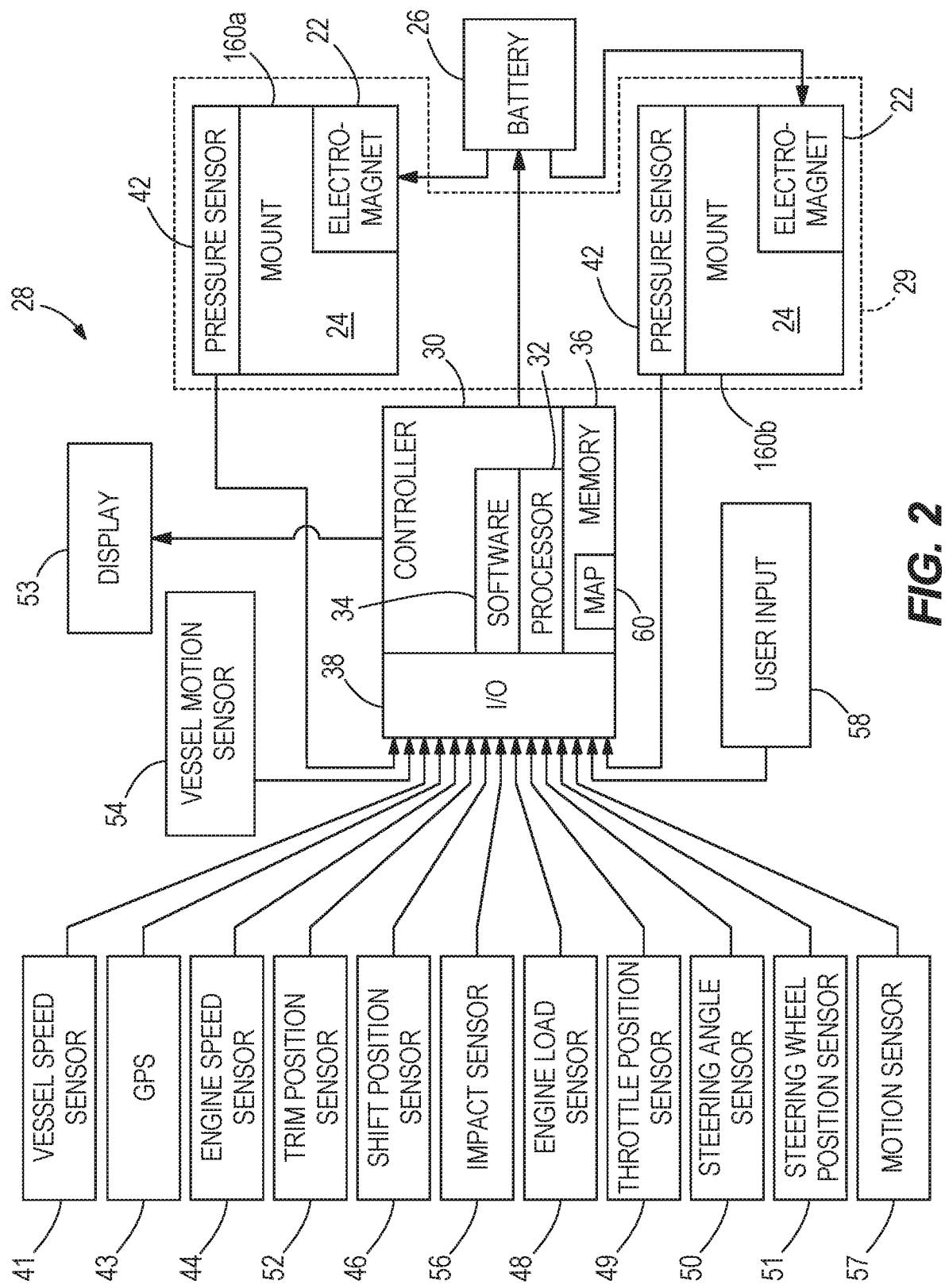
FIG. 2 is schematic depiction of a system according to the present disclosure for supporting a propulsion device with respect to a marine vessel.

FIG. 2 schematically depicts a system 28 according to the present disclosure for supporting the propulsion device 10 with respect to the marine vessel 12. The system 28 includes a controller 30 that is programmable and includes a computer processor 32, software 34, a memory (i.e., computer storage) 36 and an input/output (interface) device 38. The processor 32 loads and executes software 34, which can be stored in the memory 36. Executing the software 34 controls the system 28 to operate as described herein in further detail below. The processor 32 can comprise a microprocessor and/or other circuitry that receives and executes software 34. The processor 32 can be implemented within a single device, but can also be distributed across multiple processing devices and/or sub-systems that cooperate in executing program instructions. Examples include general purpose central processing units, application specific processors, and logic devices, as well as any other processing device, combinations of processing devices, and/or variations thereof. Likewise, the controller 30 may be a single device, or may be multiple devices cooperating to control the propulsion device(s) 10 and other aspects of the marine vessel 2. In one example described herein (FIG. 16), the controller 30 is embodied as a helm control module (HCM) 30*a* and one or more engine control modules (ECMs) 30*b* that cooperate to provide the control operations described herein. The controller 30 can be located anywhere with respect to the propulsion device 10 and marine vessel 12 and can communicate with various components of the system 28 via wired and/or wireless links. The controller 30 can have one or more microprocessors that are located together or remotely from each other in the system 28 or remotely from the system 28.

The memory 36 can include any storage media that is readable by the processor 32 and capable of storing software 34. The memory 36 can include volatile and/or nonvolatile, removable and/or non-removable media implemented in any method or technology for storage of information, such as computer readable instructions, data structures, program modules, or other data. The memory 36 can be implemented as a single storage device but may also be implemented across multiple storage devices or sub-systems. The memory 36 can further include additional elements, such as a controller capable of communicating with the processor 32.

Examples of storage devices include random access memory, read only memory, magnetic discs, optical discs, flash memory discs, virtual and/or non-virtual memory, magnetic cassettes, magnetic tape, magnetic disc storage, or other magnetic storage devices, or any other medium which can be used to store the desired information and that may be accessed by an instruction execution system, as well as any combination or variation thereof, or any other type of storage media. In some implementations, the storage media can be a non-transitory storage media.

The input/output device 38 can include any one of a variety of conventional computer input/output interfaces for receiving electrical signals for input to the processor 32 and for sending electrical signals from the processor 32 to various components of the system 28.

The controller 30, via the input/output device 38, communicates with components of the propulsion device 10 and components of the system 28 via communication links, which as mentioned herein above can be wired or wireless links. As explained further herein below, the controller 30 is capable of monitoring and controlling operational characteristics of the propulsion device 10 by sending and/or receiving control signals via the various links, such as exemplified in FIGS. 2 and 16. Although the links are each shown as a single link, the term "link" can encompass one or a plurality of links that are each connected to one or more of the components of the system 28.

The systems and methods described herein may be implemented with one or more computer programs executed by one or more control modules, each having one or more processors. The computer programs include processor-executable instructions that are stored on non-transitory tangible computer readable media. The computer programs may also include stored data, such as look up tables or value maps, providing values based on one or more input variables.

It should be noted that the extent of the connections and communication links may in fact be one or more shared connections, or links, among some or all of the components in the system. In one example, the communication links may be provided by a single controller area network (CAN) bus, but other types of links could be used. Moreover, the communication link lines are meant only to demonstrate that the various control elements, sensor elements, etc. are capable of communicating with one another, and do not represent actual wiring connections between the various elements, nor do they represent the only paths of communication between the elements. Additionally, the system 28 may incorporate various types of communication devices and systems, and thus the illustrated communication links may in fact represent various different types of wireless and/or wired data communication systems.

Figure 16:
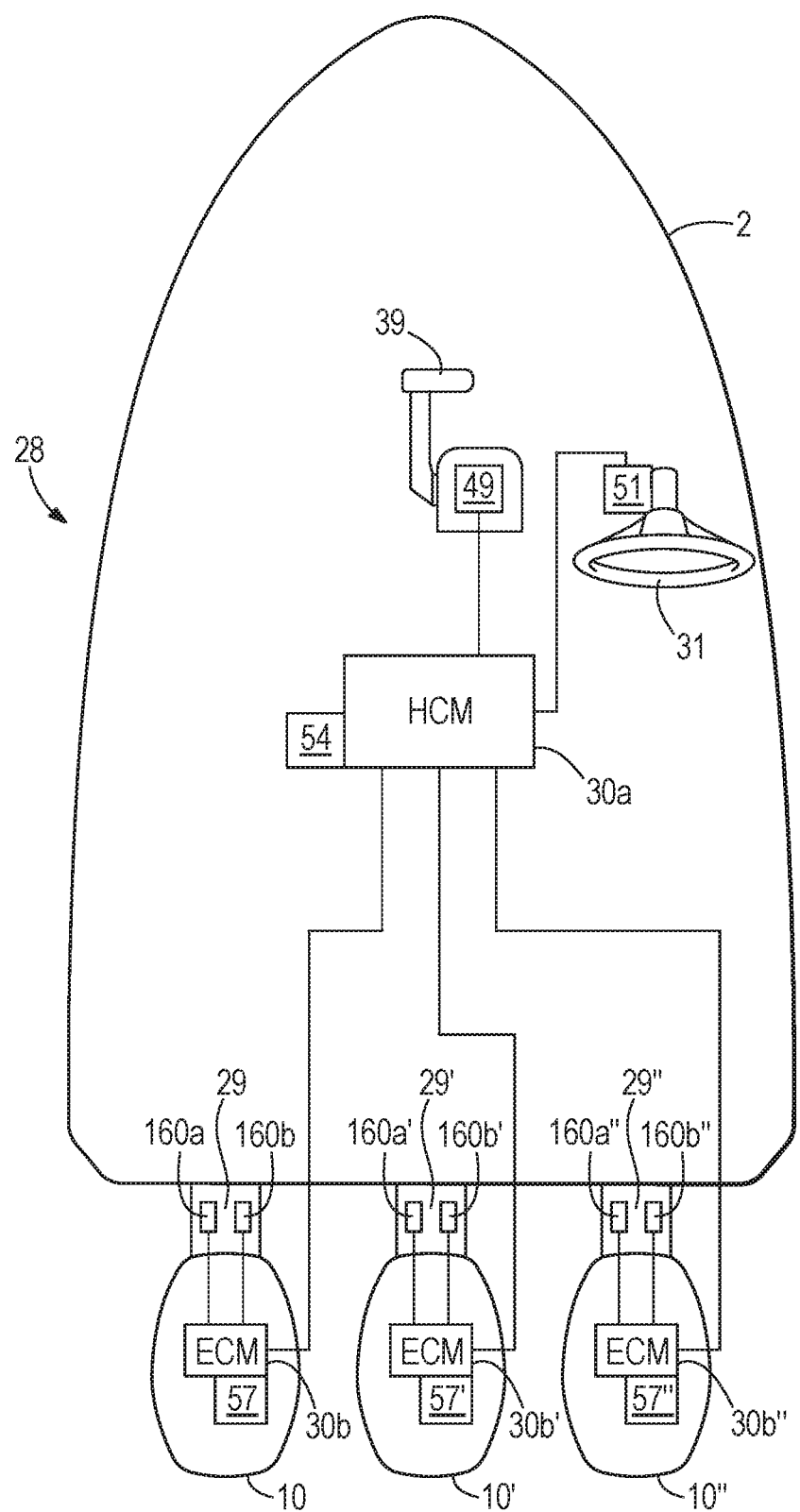
FIG. 16 depicts one embodiment of a propulsion system for a marine vessel involving three propulsion devices, each connected to the marine vessel via a mount system that includes two elastic mounts.

Each propulsion device is connected to the marine vessel 2 by a mount system 29, wherein each mount system 29 includes one or more elastic mounts 160*a*, 160*b* (FIG. 16). Mounts 160*a*, 160*b* are provided with an electromagnet 22. Each mount 160*a*, 160*b* contains an electromagnetic fluid 24. In this example, the electromagnet 22 is located in the respective mount 160*a*, 160*b*; however as will be evident from the examples below, the electromagnet 22 can alternately be located remote from the respective mount 160*a*, 160*b*. A power source 26, which can be a conventional battery or any other suitable power source, is configured to provide an amount of electricity (e.g., voltage, current) to the electromagnet 22. As described further herein below with respect to FIGS. 6-14, increasing the amount of electricity provided to the electromagnet 22 increases the shear strength of the electromagnetic fluid 24, thereby decreasing elasticity of the mount 160a, 160b. Decreasing the amount of electricity provided to the electromagnet 22 decreases the shear strength of the electromagnetic fluid 24, thereby increasing the elasticity of the mount 160a, 160b. Thus, changing the amount of electricity provided to the electromagnet 22 changes the damping characteristics of the mount 160a, 160b. This concept will become more apparent in view of the examples provided herein below with respect to FIGS. 6-14. Generally, application of a electricity across an electromagnetic fluid to alter damping characteristics of a suspension device is described, for example, in U.S. Pat. No. 4,893,800, which is incorporated herein by reference. A pressure sensor 42 is connected to each mount 160a, 160b and is configured to sense the pressure of the electromagnetic fluid 24 in the mount 160a, 160b and communicate this information to the controller 30. The type and packaging of pressure sensor 42 can vary and in some examples includes a conventional pressure transducer. The controller 30 is provided with an input from a vessel speed sensor 41. The vessel speed sensor 41 may be, for example, a pitot tube sensor, a paddle wheel type sensor, or any other speed sensor appropriate for sensing the actual speed of the marine vessel. Alternatively or additionally, the vessel speed may be obtained by taking readings from a GPS device 43, which calculates speed by determining how far the vessel has traveled in a given amount of time according to known methods.

An engine speed sensor 44 is configured to sense a current engine speed of the propulsion device 10. In certain examples, the engine speed sensor 44 senses rotations per minute (RPM) of the engine. The type and location of engine speed sensor 44 can vary and in one example is a Hall Effect or variable reluctance sensor located near the encoder ring of the engine. Such an engine speed sensor 44 is known in the art and commercially available, for example, from CTS Corporation or Delphi.

A shift position sensor 46 is configured to sense a current gear state (e.g. position) of a clutch or transmission associated with the propulsion device 10. In some examples, the shift position sensor 46 senses a current position of a shift linkage or lever position associated with a conventional shift/throttle control lever. The gear state that is sensed by the shift position sensor 46 is communicated to the controller 30. In one typical example known in the art, the gear state may be one of a forward shift position where the propulsion device propels the marine vessel in a forward direction, a reverse shift position where the propulsion device propels the marine vessel in a rear-ward direction, and a neutral state where no propulsion force is exerted. The type and location of shift position sensor 46 can vary. In one example, the shift position sensor 46 includes a rotary encoder, which may be a potentiometer and an electronic converter, such as an analog to digital converter that outputs discrete analog to digital (ADC) counts that each represents a position of the noted shift linkage or lever position. Such potentiometer and electronic converter combinations are known in the art and commercially available, for example, from CTS Corporation.

Similarly, a throttle position sensor 49 is configured to sense a current throttle demand, which is the user demand commanded by an input device, such as a throttle control lever. In some examples, the throttle position sensor 49 senses a current position of a throttle linkage or a position of a throttle control lever 39. The output of the throttle position sensor 49 is sent to the controller 30 which interprets it as a throttle demand input for controlling various subsystems of the one or more propulsion devices 10, including for fueling, air intake, spark, etc. For example, the throttle position sensor 49 may include a potentiometer and an electric converter, such as an analog to digital converter that outputs discrete ADC counts that each represents a position of the noted throttle linkage or throttle control lever position.

An engine load sensor 48 is configured to sense a current engine load of the propulsion device 10 and communicate this information to the controller 30. The type of engine load sensor 48 can vary. In certain examples, the engine load sensor 48 is provided by the noted engine speed sensor 44 in combination with a throttle valve position sensor that senses position of a throttle valve associated with the engine on the propulsion device 10. The type of throttle position sensor can vary. One example of a throttle positon sensor can be a wiper-type sensor, which can be located on the body of the noted throttle valve and is commercially available from Cooper Auto or Walbro. Engine load can thus be provided to controller 30 via comparison of the outputs of the noted throttle position sensor and the engine speed sensor 44. In other examples, the load sensor may involve a manifold absolute pressure (MAP) sensor, wherein the engine load is determined based on the manifold pressure.

A steering angle sensor 50 is configured to sense a current steering angle of the propulsion device 10 with respect to the marine vessel and provide this information to the controller 30. The type of steering angle sensor 50 can vary. In certain examples, the steering angle sensor 50 can include an encoder mounted on along a vertical steering axis of the propulsion device 10, as is conventional.

The system may further include a steering wheel position sensor 51 configured to sense the angular position of a steering wheel 31 steering the marine vessel 2. In one known example, the steering wheel position sensor 51 is a rotary encoder outputting ADC counts representing a position of the steering wheel 31. In other examples, the steering wheel position sensor 51 may instead be positioned on steering linkage between the steering wheel 31 and steering actuators associated with the propulsion device(s) 10.

Figure 15A:
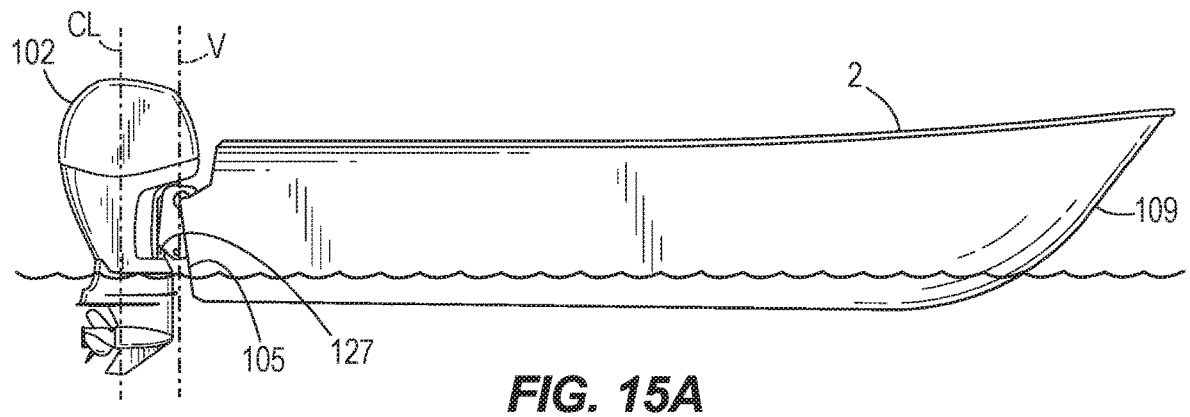
FIGS. 15A-15C illustrate a trimmable propulsion device mounted to a marine vessel.
Figure 15B:
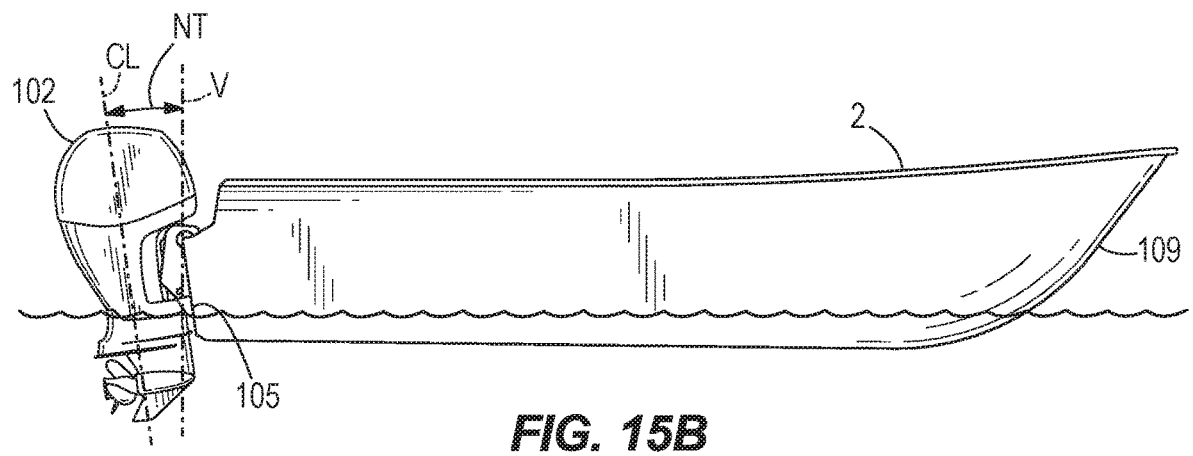
Figure 15C:
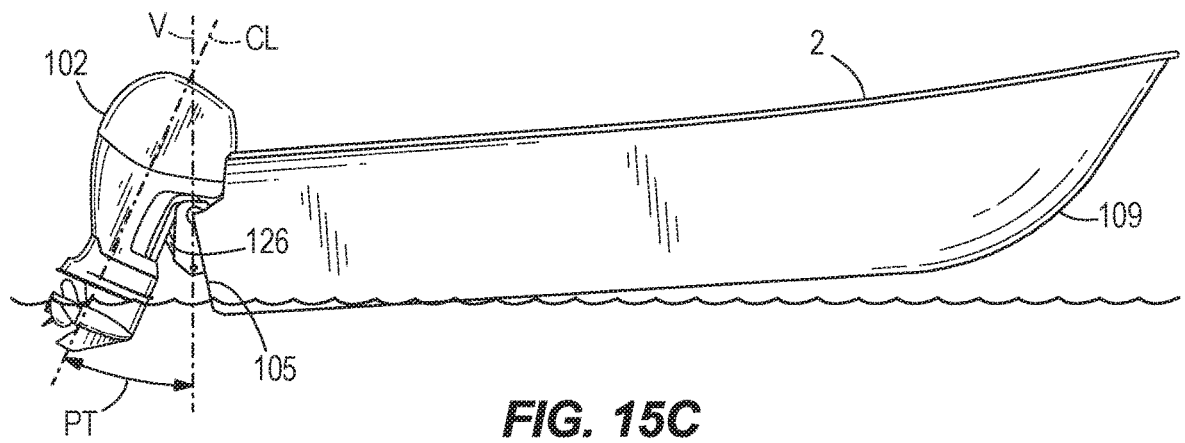

A trim position sensor 52 is configured to sense a current trim positon of the propulsion device 10 and provide this information to the controller 30. Trim control systems are known in the art, such as that exemplified and described at U.S. Pat. No. 9,598,160 incorporated herein by reference. FIGS. 15A-15C illustrate an example of a marine vessel 2 having a trim system for controlling an the angle at which the propulsion devices are supported with respect to the marine vessel 2. In this example, the marine vessel 2 is equipped with a propulsion device 10, such as the outboard motor shown, on its transom 105. The propulsion device can be trimmed to different angles with respect to the transom 105 via trim devices 127, such as hydraulic cylinders having one end coupled to the transom 105 of the vessel 2 and the other end coupled to the outboard motor as known to those having ordinary skill in the art. In FIG. 15A, the propulsion device 10 is shown in a neutral (level) trim position, in which the propulsion device 10 is in more or less of a vertical position. This can be seen by comparing centerline CL of the propulsion device 10 with vertical line V, where the two lines are parallel. In FIG. 15B, the propulsion device 10 is shown in a trimmed-in (sometimes referred to as trimmed down) position. In other words, the lines CL and V will intersect below where the propulsion device 10 is connected to the transom 105. This may be referred to as a negative trim angle (NT) according to an exemplary convention. In FIG. 15C, the propulsion device 10 is shown in a trimmed out (sometimes referred to as trimmed up)

position. The lines CL and V will intersect above the drive unit's connection point to the transom 105. This may be referred to as a positive trim angle (PT).

The positions in FIGS. 15A and 15B are generally used when the marine vessel 2 is operating at slower speeds. For example, the trim position shown in FIG. 15A is often used when the marine vessel 2 is in a joysticking mode or is docking. The trim position in FIG. 15B is often used during launch of the marine vessel 2, before the marine vessel 2 has gotten up to speed and on plane. In contrast, the trim position shown in FIG. 15C is often used when the marine vessel 2 is on plane and high speeds are required. At high speeds, the trim position shown in FIG. 15C causes the bow 109 of the marine vessel 2 to rise out of the water as shown. Trim position is often expressed as a percentage from 0% to 100%, where 0% is the fully trimmed-in position and 100% is the fully trimmed out position. The type of trim position sensor 52 can vary. In certain examples, the trim position sensor 52 includes an encoder positioned along a trim axis of the propulsion device 10.

A vessel motion sensor 54 is configured to measure acceleration and/or angular position of the marine vessel and provides this information to the controller 30. In one example, the motion sensor 54 includes a conventional 3-axis accelerometer and/or 3-axis gyroscope fixed to the marine vessel 2. In certain embodiments the motion sensor may also include a magnetometer. For example, the vessel motion sensor 54 measure, a vessel angle of the marine vessel 2 with respect to horizontal, such as to track the angular position of the marine vessel 2 as it banks during a turn at high speed. An underwater impact sensor 56 is provided for sensing a future impact to the propulsion device 10 and communicating this information to the controller 30. They type of impact sensor 56 can vary and can include, for example, a sonar system, laser system, and/or the like.

A motion sensor 57 is configured to sense motion of the propulsion device 10 with respect to the marine vessel, for example vibration of the propulsion device 10 caused by environmental forces including wind and/or waves. The motion sensor 57 can be mounted on the propulsion device 10. The type of motion sensor 57 can vary and can include a global navigation satellite device with an internal measurement unit that collects angular velocity and linear acceleration, which data is sent to the controller 30. This type of motion sensor is well known in the art, an example is commercial available from XSENS, Product No. MTi-G-710. In other embodiments, the motion sensor 57 may include on or more of a 3-axis accelerometer, a 3-axis gyroscope, and/or a magnetometer based upon which motion and/or position of the marine vessel is determined in 3-dimensional space.

The system 28 also includes a user input device 58 for inputting user commands to the controller 30. The user input device 58 can include a combination shift/throttle lever 39, a steering wheel 31, and/or a joystick. Other types of input devices such as a button, switch, touchscreen, and/or the like can also be used in addition to or instead of these conventional devices.

Advantageously, as described further herein below, the controller 30 is programmed to actively and automatically adapt the amount of electricity that is supplied to the electromagnets 22 from the power source 26 based upon one or more conditions of the system 28. In some examples, the memory stores one or more thresholds to which the controller 30 compares current sensed values and then controls the amount of electricity accordingly. In some examples, the memory 36 stores one or more map(s) 60 that correlates the noted one or more conditions of the system 28 to the amount of electricity. For example, a base map 60 may be stored in memory 36 for controlling the electricity, power, to one or more of the electromagnets 22 under normal operating conditions, and additional maps or control algorithms may be utilized upon detection of certain, defined operating conditions requiring specialized control. The controller 30 is configured to follow the map 60 to apply a programmed amount of electricity based upon current sensed values. In addition or alternately, the memory 36 stores a protocol that is followed by the controller 30 to thereby adapt the amount of electricity. In other words, the controller 30 is programmed to control the power source 26 to change the amount of electricity according to the map 60 and/or other protocol stored in the memory. The type of conditions upon which the controller 30 adapts the amount of electricity can vary and in some examples the controller 30 can be programmed to adapt the amount of electricity based upon more than one condition considered in combination. The conditions upon which the controller 30 adapts the amount of electricity can include characteristics of the propulsion device 10 and/or marine vessel 2. These conditions typically do not vary and can be calibrated in the controller 30 during setup of the system. The conditions upon which the controller 30 adapts the amount of electricity can include operational characteristics of the marine vessel, including speed, acceleration, steering angle, motion, throttle demand, and/or the like. The controller 30 can be configured to adapt the amount of electricity upon the occurrence of one or more of these types of operational characteristics (i.e. in real-time), as further described herein below.

In some examples, the condition of the system upon which the controller 30 adapts the amount of electricity includes a pressure of the electromagnetic fluid 24 in the mount 160a, 160b. The pressure sensor 42 is configured to sense the pressure of the electromagnetic fluid 24 in the mount 160a, 160b and communicate this information to the controller 30, which compares the sensed pressure to the map 60 to thereby identify an amount of electricity to be applied to the electromagnet 22. Thereafter, the controller 30 controls the power source 26 to apply that amount of electricity. In some examples, the controller 30 can be configured to decrease the amount of electricity when the pressure of the electromagnetic fluid 24 exceeds a pressure threshold that is calibrated and stored in the memory 36. The controller 30 can be programmed to compare the pressure of the electromagnetic fluid 24, as sensed by the pressure sensor 42, to the stored pressure threshold, and thereafter control the power source 26 to decrease the amount of electricity when the pressure of the electromagnetic fluid 24 exceeds the pressure threshold. Thus this feature can protect the mount 160a, 160b from over pressure.

The controller 30 can also be programmed to alert an operator of the marine vessel that the propulsion device 10 is experiencing high static loading, for example due to rough water and/or high speed operations. In some examples, the controller 30 can be programmed to store this information in the memory 36 for service and/or warranty purposes. This feature can also actively monitor and adjust the amount of electricity during travel of the marine vessel according to the map 60 and/or another protocol saved in the memory 36, thus providing the system 28 with ride characteristics that are selected by the calibrator and/or the user.

In certain examples, the condition of the system can include a current state of the propulsion device 10. In these examples, the shift position sensor 46 is configured to sense the current gear state of the propulsion device 10 and communicate this information to the controller 30. Based upon this information, the controller 30 is configured to control the power source 26 to apply an appropriate amount of electricity to the electromagnet 22, as determined for example by the map 60 and/or another protocol saved in the memory 36. For example, it can be desirable to limit displacement of the propulsion device 10 during forward and/or reverse shift positon of propulsion device 10 to provide certain ride characteristics, while it can also be desirable to allow displacement of the propulsion device 10 during neutral state of the propulsion device to limit noise, vibration and/or harshness. In this non-limiting example, the controller 30 can be programmed to increase the amount of electricity during forward and reverse shift positions and decrease the amount of electricity during neutral state.

In certain examples, the condition of the system 28 includes a current trim position of the propulsion device 10. In these examples, the noted trim position sensor 52 is configured to sense the current trim position of the propulsion device 10 and communicate this information to the controller 30. Based upon this information, the controller 30 is programmed to control the power source 26 to apply a certain amount of electricity to the electromagnet 22, as determined for example by the map 60 or other protocol saved in memory 36. In certain examples, the controller 30 can be programmed to increase the amount of electricity when the current trim positon of the propulsion device 10 exceeds a trim position threshold stored in the memory 36. In this non-limiting example, the controller 30 is capable of decreasing the resiliency of the mounts 160a, 160b when the propulsion device 10 is fully trimmed out, which typically happens when the marine vessel 12 is docked.

In certain examples, the condition of the system 28 can include a future or predicted impact to the propulsion device 10. In these examples the impact sensor 56 is configured to sense the future or predicted impact to the propulsion device 10 and communicate this information to the controller 30. Based upon this information, the controller 30 is programmed to control the power source 26 to adapt the amount of electricity. In some non-limiting examples, the controller 30 can be programmed to decrease the amount of electricity when an impact to the propulsion device 10 is predicted, thus allowing the propulsion device 10 to deflect when hit. This can protect the propulsion device 10 from being damaged.

In certain examples, the condition of the system 28 can include a current engine load of the propulsion device 10. In these examples, the engine load sensor 48 is configured to sense the current engine load of the propulsion device 10 and communicate this information to the controller 30. The controller 30 is configured to control the power source 26 to adapt the amount of electricity based upon, for example, the noted map 60 or other protocol saved in the memory 36. The controller 30 thus advantageously can be calibrated to adjust the ride characteristics of the propulsion device 10 during translation of the marine vessel 12.

In some examples, the condition of the system 28 can include the current engine speed of the propulsion device 10. In these examples, the engine speed sensor 44 is configured to sense the current engine speed of the propulsion device 10 and communicate this information to the controller 30, which in turn is configured to control the power source 26 based upon, for example the protocol set forth in the map 60 stored in the memory 36. In some examples, the controller 30 is programmed to decrease the amount of electricity when the current engine speed is below an engine speed threshold saved in the memory 36. In certain examples, the controller 30 is configured to increase the amount of electricity when the current engine speed is above an engine speed threshold stored in the memory 36. The controller 30 thus advantageously can be calibrated to adjust the ride characteristics of the propulsion device 10 during translation of the marine vessel 12.

In certain examples, the condition of the system 28 can include a current steering angle of the propulsion device 10. In these examples, the steering angle sensor 50 is configured to sense the current steering angle and communicate this information to the controller 30. In turn, the controller 30 is configured to control the power source 26 to control the amount of electricity applied to the electromagnet 22. In some examples, the controller 30 is configured to increase the amount of electricity when the current steering angle of the propulsion device 10 is outside of a stored range.

In certain examples, the condition of the system 28 includes and off-state of an internal combustion engine associated with the propulsion device 10. In these examples, the controller 30 can be programmed to increase the amount of electricity to lock the mount 160a, 160b in position when the off state of the engine occurs.

As shown in FIG. 2, the system 28 can further include the user input device 58 for inputting a desired state of elasticity of the mount 160a, 160b. In these examples, the controller 30 can be configured to adapt the amount of electricity to achieve the desired state of elasticity of the mount 160a, 160b, as for example according to the map 60 or other protocol saved in the memory 36. The controller 30 can also be configured to control a display device 53 for displaying the condition of the mount 160a, 160b to an operator of the system 28.

FIGS. 3-5 and 17-23 depict non-limiting exemplary methods according to the present disclosure.

Figure 3:
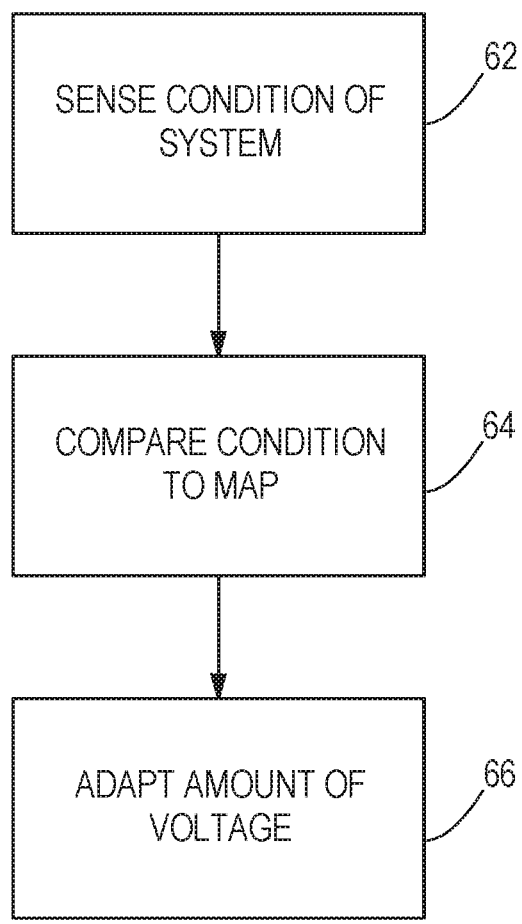
FIGS. 3-5 are flow charts depicting exemplary methods according to the present disclosure.

As shown in FIG. 3, at step 62, one or more of the above noted sensors is configured to sense one or more conditions of the system 28 and communicate this information to controller 30. At step 64, the controller 30 is configured to compare the sensed condition(s) to the map 60 or to another protocol stored in the memory 36. At step 66, the controller 30 is configured to adapt the amount of electricity that is applied by the power source 26 to the electromagnet 22.

Figure 4:
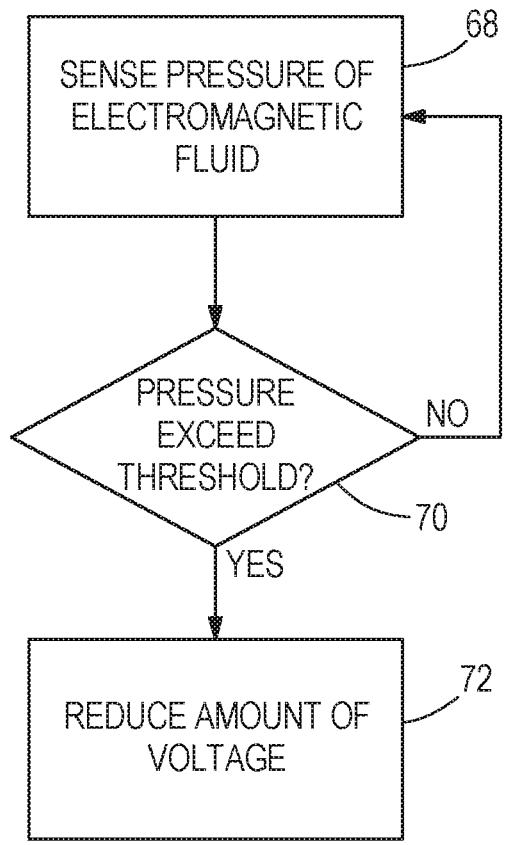

FIG. 4 depicts an example wherein the pressure sensor 42 is utilized to sense pressure of electromagnetic fluid 24 in the electromagnet 22, at step 68. At step 70, the controller 30 is configured to compare the pressure of the electromagnetic fluid 24 to a pressure threshold that is stored in the memory 36. If the pressure exceeds the pressure threshold, at step 72, the controller 30 is programmed to control the power source 26 to reduce the amount of electricity that is applied to the electromagnet 22.

Figure 5:
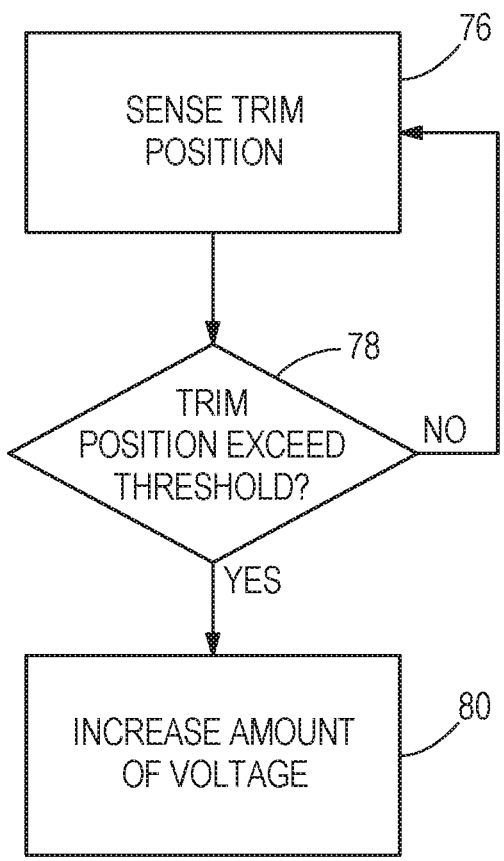

In FIG. 5, at step 76, the trim position sensor 52 senses the trim positon of the propulsion device 10 with respect to the marine vessel 12. At step 78, the controller 30 is configured to compare the trim position that is sensed by the trim position sensor 52 to a threshold that is stored in the memory 36. If the trim position exceeds the threshold, the controller 30 is configured to control the power source 26 at step 80 to increase the amount of electricity applied to the electromagnet 22.

In certain examples, the map 60 can correlate trim and steering positions for specific tight transom installations, having limited space for movement of the propulsion device 10. The map 60 can dictate "pinch" points where the amount of electricity needs to be adjusted to minimize deflection of the mounts 160a, 160b and thus prevent cowl collision.

In other examples, the controller 30 can actively monitor for high internal mount pressure and/or motion, and adjust the amount of electricity during travel of the marine vessel, providing restriction on the amount of deflection of the mounts 160a, 160b to prevent cowl collision in tightly packaged transom arrangements.

In other words, the system 28 can be configured to allow tightly packed transom arrangements, while still accomplishing functional goals such as power, speed and acceleration. The inventors have recognized that it is desirable to provide marine propulsion systems having increased power, speed, and acceleration; however this often requires the designer to add larger propulsion devices and/or multiple propulsion devices to the system. As stated above, the inventors have also recognized that it is desirable to provide marine propulsion systems having a smaller footprint, i.e. smaller package size, design and/or layout. These interests compete with each other and thus present design challenges. The larger the size and/or number of propulsion devices, the greater the power, speed and acceleration. However when larger propulsion devices and/or multiple propulsion devices are added, it becomes difficult to meet small package size, design and layout requirements.

During operation of a marine propulsion system, environmental forces on the marine propulsion devices, such as wind and/or waves, will normally cause the marine propulsion devices to vibrate and/or otherwise move with respect to surrounding structures, such as the hull of marine vessel and/or adjacent marine propulsion devices on the transom. Also, each marine propulsion device is typically steerable about a steering axis between port and starboard orientations. As such, for every marine propulsion system layout, there is a minimum amount of spacing required between the propulsion device and adjacent structures. That is, the designer must include enough space between each propulsion device on the transom to accommodate the above-mentioned vibration and steering movements, and specifically to avoid collision between the propulsion device and adjacent structures.

Through research and experimentation, the present inventors have determined that it is possible to utilize the above-described systems to achieve higher performance with tighter tolerances, i.e., packaging the propulsion devices with less surrounding space. More specifically, the present inventors have realized that the amount of spacing that is actually required in the marine propulsion system layout varies depending upon the operating condition of the system. For example, when the marine propulsion system is inoperative or operating at idle and/or at relatively low speeds, minimal environmental forces will typically impact the propulsion device and thus only a relatively small amount of spacing is normally required to accommodate vibration or other movements caused by environmental forces. On the other hand, when the marine propulsion system is operating at relatively high speeds, it often will encounter more forceful environmental forces, such as high wind and/or waves, and thus a relatively large amount of spacing is required to prevent collision between the propulsion device and adjacent structures. Other factors, such as the steering angle of the propulsion device will also impact the necessary spacing between the propulsion device and adjacent structures. When the propulsion device is in a straight-ahead orientation, environmental forces are less likely to cause movement of the propulsion device and adjacent structures. On the other hand, when the propulsion device is steered into an extreme turning orientation, it will move closer to adjacent structures, thus making it more likely that environmental forces will cause movements of the propulsion device that result in a collision with the adjacent structure.

Based upon these realizations, the present inventors developed systems and methods that automatically adapt the amount of electricity applied to the electromagnet during operation (e.g. translation) of the marine vessel—so as to reduce the likelihood that the propulsion device impacts an adjacent structure on the marine vessel as a result of motion of the propulsion device caused by environmental forces including wind and waves. Further examples are provided herein below.

In some examples, the controller 30 is programmed to automatically adapt the amount of electricity applied to the electromagnet 22 during operation of the marine vessel so as to reduce the above-described likelihood that the propulsion device 10 impacts an adjacent structure on the marine vessel as a result of motion of the propulsion device 10 caused by environmental forces including wind and waves. The "adjacent structure" can be another propulsion device 10 on the marine vessel and/or the hull of the marine vessel itself and/or any other adjacent structure. The controller 30 is configured to automatically increase the amount of electricity applied to the electromagnet 22 when it determines that the propulsion device 10 has become more likely to impact the adjacent structure. The controller 30 is further programmed to automatically decrease the amount of electricity applied to the electromagnet 22 when it determines that the propulsion device 10 has become less likely to impact the adjacent structure. The way in which the controller 30 determines the likelihood of impact to the propulsion device 10 can vary. In some examples, the controller 30 is programmed to determine whether the propulsion device 10 has become more or less likely to impact the adjacent structure based at least in part upon the present steering angle of the propulsion device 10. In this example, the controller 30 is programmed to increase the amount of electricity applied to the electromagnet 22 when the present steering angle becomes greater than (i.e. further away from a straight-ahead orientation) a threshold steering angle value stored in the memory 36. The controller 30 is further programmed to decrease the amount of electricity applied to the electromagnet 22 when the present steering angle becomes less than (i.e. closer to the straight-ahead orientation) the threshold steering angle value stored in the memory 36. The threshold steering angle is a value that can be calibrated by the engine designer through trial and error or based on historical data for the same or similar layouts.

In some examples, the controller 30 is programmed to determine whether the propulsion device 10 has become more or less likely to impact the adjacent structure based at least in part upon a present motion characteristic of the propulsion device with respect to the marine vessel. In this example, the controller 30 is programmed to increase the amount of electricity applied to the electromagnet 22 when the present motion (e.g. vibration) of the propulsion device 10 becomes greater than a threshold motion value stored in the memory 36. The controller 30 is further programmed to decrease the amount of electricity applied to the electromagnet 22 when the present motion (e.g. vibration) of the propulsion device 10 becomes less than the threshold motion value stored in the memory 36. The threshold motion value is a value that can be calibrated by the engine designer through trial and error or based on historical data for the same or similar layouts.

In some examples, the controller 30 is programmed to determine whether the propulsion device 10 has become more or less likely to impact the adjacent structure based at least in part upon the present speed of the engine. In this example, the controller 30 is configured to increase the amount of electricity applied to the electromagnet 22 when the present speed of the engine becomes greater than a threshold engine speed value stored in the memory 36. The controller 30 is configured to decrease the amount of electricity applied to the electromagnet 22 when the present speed of the engine becomes less than the threshold engine speed value stored in the memory 36. The threshold engine speed value is a value that can be calibrated by the engine designer through trial and error or based on historical data for the same or similar layouts. Similar to these examples, in other examples, the controller 30 can be programmed to determine whether the propulsion device 10 has become more or less likely to impact the adjacent structure based at least in part upon the present engine load, i.e. how the present engine load compares to a threshold engine load stored in the memory 36.

In some examples, the controller 30 is programmed to determine whether the propulsion device 10 has become more or less likely to impact the adjacent structure based at least in part upon the state of acceleration of the propulsion device 10. In this example, the controller 30 is programmed to increase the amount of electricity applied to the electromagnet 22 when the present state of acceleration of the propulsion device 10 becomes greater than a threshold acceleration value stored in the memory 36. The controller 30 is configured to decrease the amount of electricity applied to the electromagnet 22 when the present state of acceleration of the propulsion device 10 becomes less than the threshold acceleration value stored in the memory 36. The threshold acceleration value is a value that can be calibrated by the engine designer through trial and error or based on historical data for the same or similar layouts.

In some examples, the controller 30 is programmed to determine whether the propulsion device 10 has become more or less likely to impact the adjacent structure based at least in part upon the present trim position of the propulsion device 10. In this example, the controller 30 is programmed to increase the amount of electricity applied to the electromagnet 22 when the present trim position of the propulsion device 10 becomes greater than a threshold trim position value stored in the memory 36. The controller 30 is configured to decrease the amount of electricity applied to the electromagnet 22 when the present trim position of the propulsion device 10 becomes less than the threshold trim position value stored in the memory 36. The threshold trim position value is a value that can be calibrated by the engine designer through trial and error or based on historical data for the same or similar layouts.

In some examples, the controller 30 is programmed to operate based on any combination of the above-mentioned values. For example, the controller 30 can be programmed to determine the likelihood that the propulsion device 10 impacts the adjacent structure on the marine vessel based at least in part on a combination of the present speed of an engine associated with the propulsion device 10 and the present motion of the propulsion device 10 with respect to the marine vessel. For example, the map 60 stored in the memory 36 can correlate speed of the engine and motion of the propulsion device 10 with respect to the marine vessel to an amount of electricity applied to the electromagnet 22. Based on the present speed of the engine and motion of the propulsion device 10, the map 60 will inform the controller 30 regarding the likelihood that the propulsion device 10 impacts the adjacent structure on the marine vessel. The controller 30 can thus be programmed to control the power source 26 in accordance with the map 60. The values of the map 60 can be calibrated by the engine designer through trial and error or based on historical data for the same or similar layouts.

In other examples, the controller 30 can be programmed to determine the likelihood that the propulsion device 10 impacts the adjacent structure on the marine vessel based at least in part on a combination of the present speed of an engine associated with the propulsion device 10 and a present steering angle of the propulsion device 10. In this example, the map 60 stored in the memory 36 correlates speed of the engine and steering angle of the propulsion device 10 to an amount of electricity applied to the electromagnet 22. Based on the present speed of the engine and present steering angle of the propulsion device 10, the map 60 will inform the controller 30 regarding the likelihood that the propulsion device 10 impacts the adjacent structure on the marine vessel. The controller 30 can thus be programmed to control the power source 26 in accordance with the map 60. The values of the map 60 can be calibrated by the engine designer through trial and error or based on historical data for the same or similar layouts.

It will thus be recognized that the present disclosure provides methods for supporting a propulsion device 10 with respect to a marine vessel. The methods can include (1) providing an elastic mount 160a, 160b that supports the propulsion device 10 with respect to the marine vessel; (2) configuring an electromagnet 22 so that increasing an amount of electricity applied to the electromagnet 22 increases the shear strength of an electromagnetic fluid 24 in the elastic mount 160a, 160b thereby decreasing elasticity of the elastic mount 160a, 160b, and so that decreasing the amount of electricity applied to the electromagnet 22 decreases the shear strength of the electromagnetic fluid 24 in the elastic mount 160a, 160b thereby increasing the elasticity of the elastic mount 160a, 160b; and (3) automatically adapting the amount of electricity applied to the electromagnet 22 during translation of the marine vessel so as to reduce a likelihood that the propulsion device 10 impacts an adjacent structure on the marine vessel as a result of motion of the propulsion device 10 caused by environmental forces including wind and waves. The methods can further include (4) increasing the amount of electricity applied to the electromagnet 22 when the propulsion device 10 becomes more likely to impact the adjacent structure and decreasing the amount of electricity applied to the electromagnet 22 when the propulsion device 10 has become less likely to impact the adjacent structure.

According to some examples, the methods include determining the likelihood that the propulsion device 10 impacts the adjacent structure on the marine vessel based at least in part on a present speed of an engine associated with the propulsion device 10 and a present motion of the propulsion device 10 with respect to the marine vessel. According to some examples, the methods include determining the likelihood that the propulsion device 10 impacts the adjacent structure on the marine vessel based at least in part on a present speed of an engine associated with the propulsion device 10 and a present steering angle of the propulsion device 10.

FIGS. 6-14 depict examples of suitable mounts 260a-260c that can be substituted for one or more of the mounts 16a-16b shown in FIG. 1.

Figure 6:
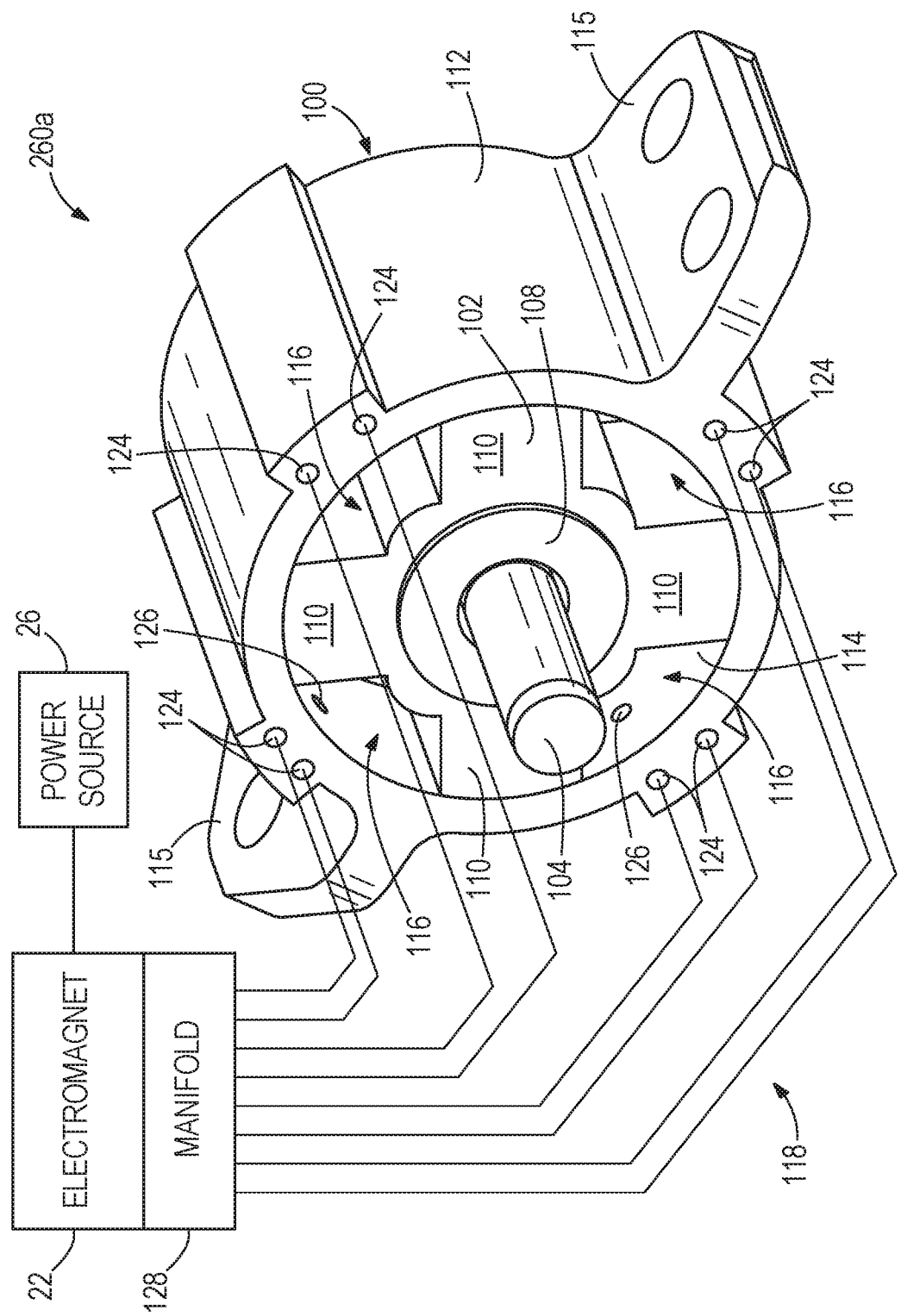
FIGS. 6-7 depict a first example of an elastic mount according to the present disclosure.
Figure 7:
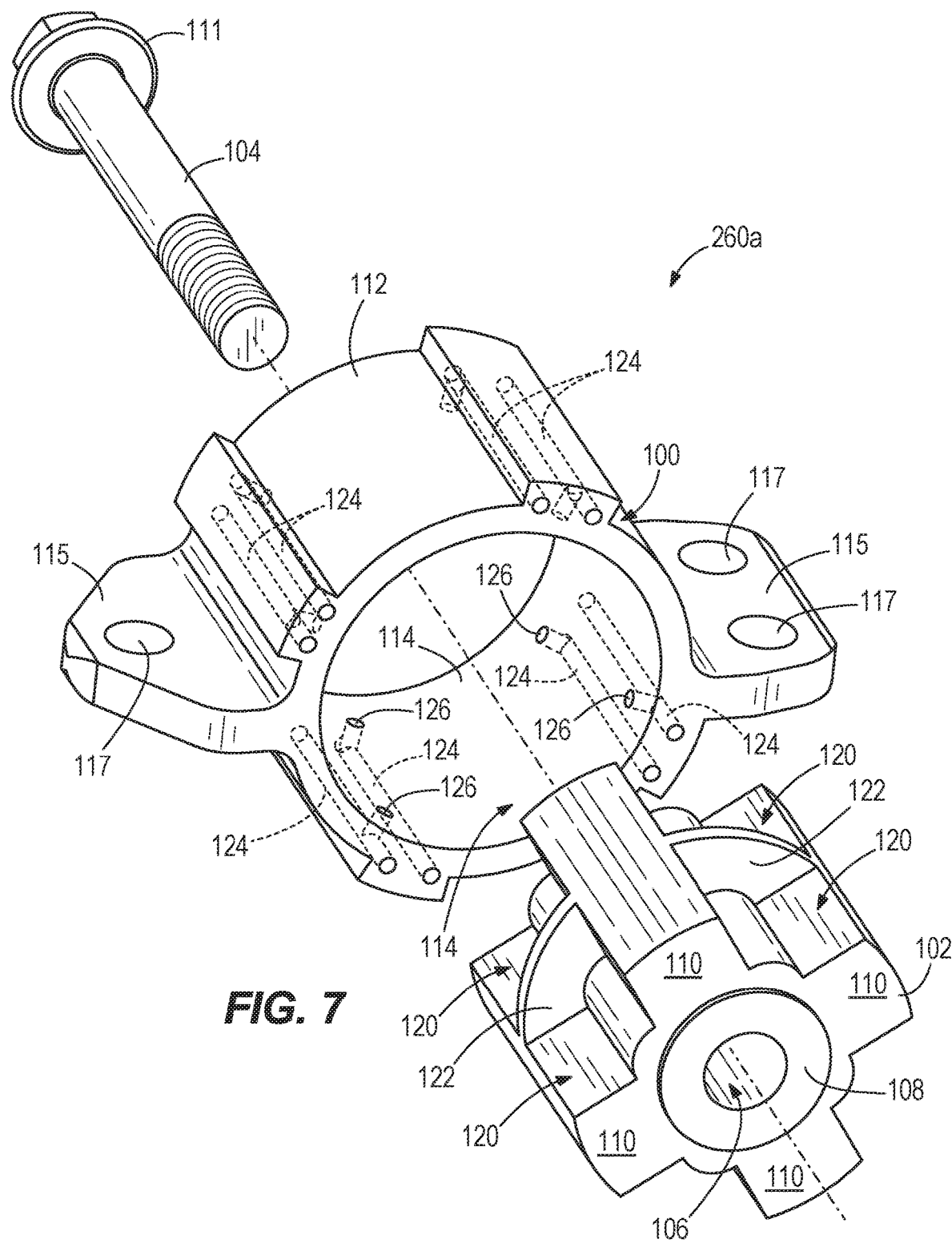
Figure 8:
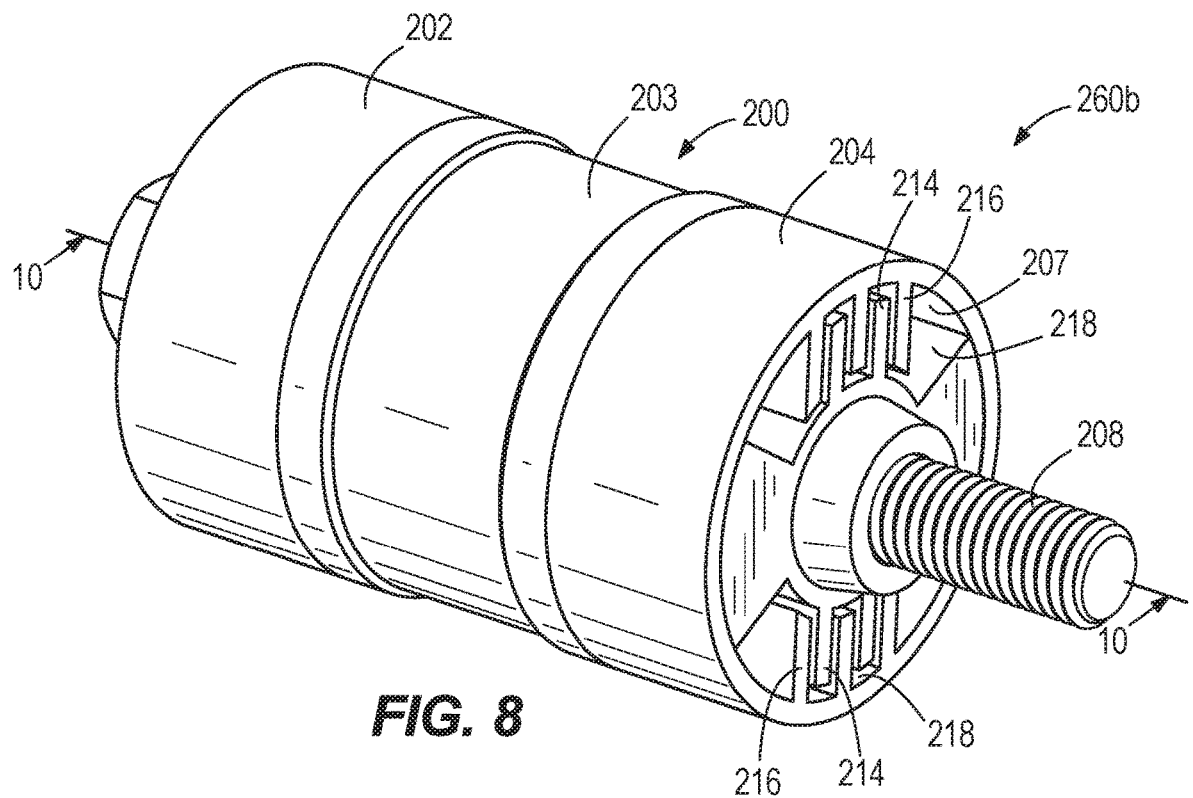
FIGS. 8-11 depict a second example of an elastic mount according to the present disclosure.
Figure 9:
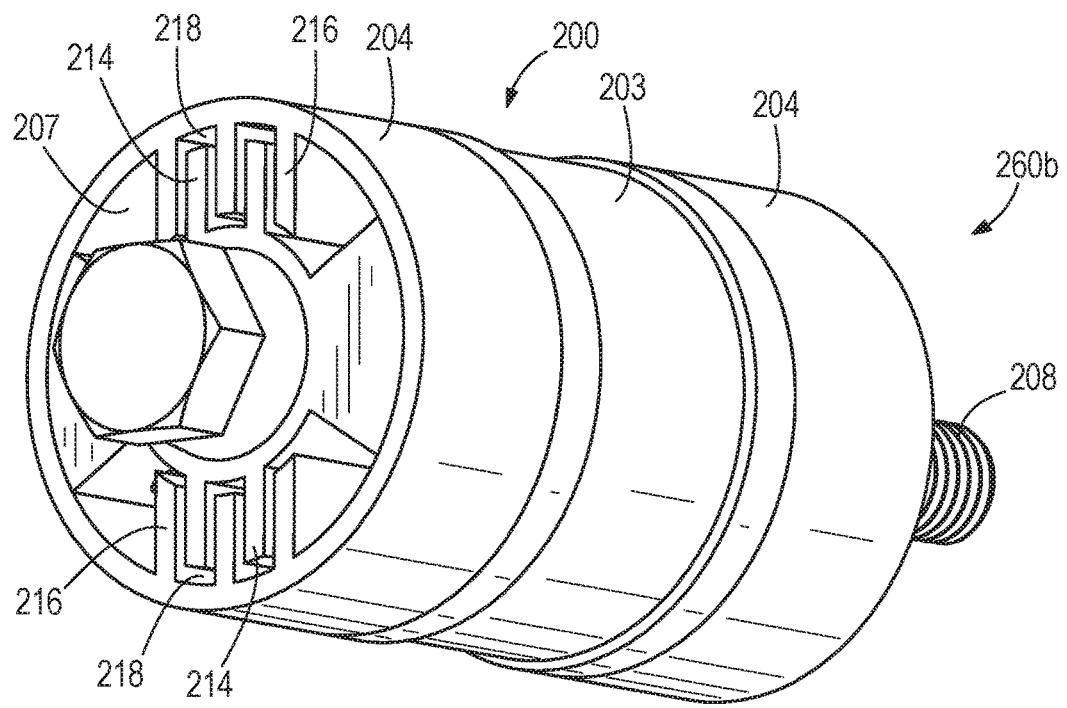
Figure 10:
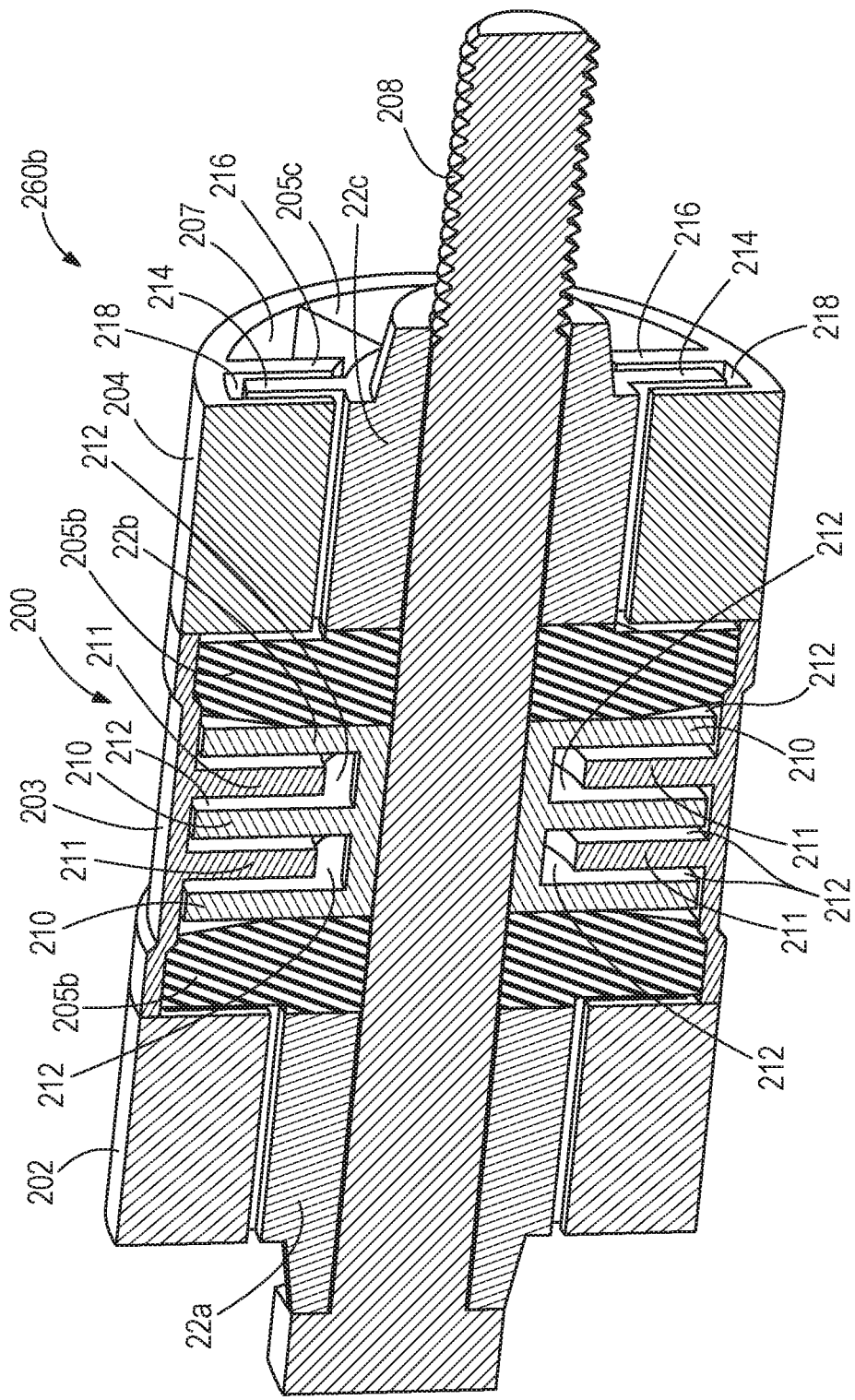
Figure 11:
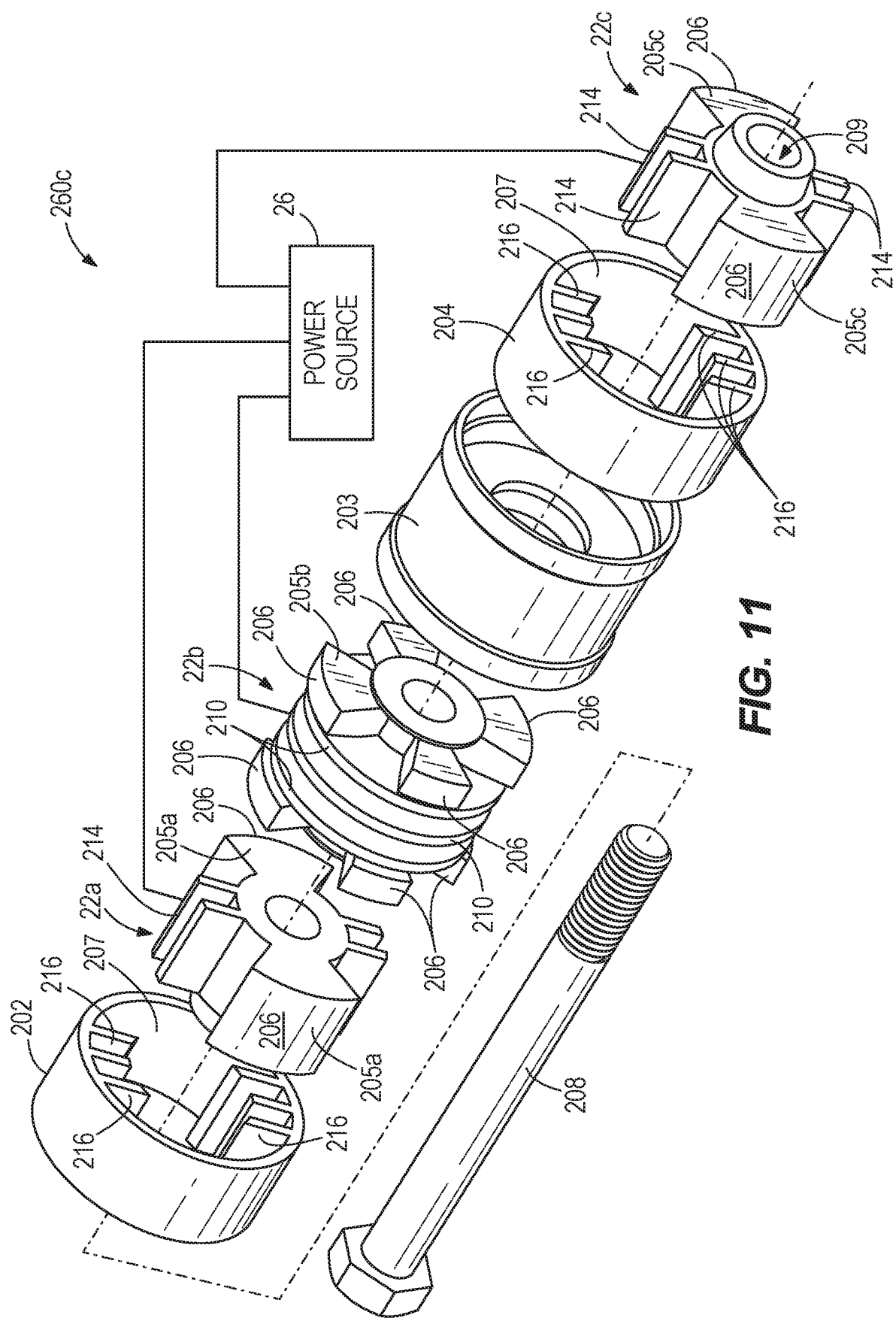

FIGS. 6 and 7 depict a first example of a mount 260a according to the present disclosure. The mount 260a is designed to replace the mounts 16a and/or 16b shown in FIG. 1, which are disposed between connection points of the propulsion device 10 and marine vessel, including for example at the adapter plate 18 and drive shaft housing 20 of the propulsion device 10.

In FIGS. 6 and 7, the mount 260a includes a housing 100, a resilient member 102 fixed to the housing 100 and an elongated connector 104 that extends though the resilient member 102. In the illustrated example, the elongated connector 104 is a bolt however the type and configuration of the elongated connector 104 can vary from what is shown. The elongated connector 104 extends through a through-bore 106 in a hub 108 of the resilient member 102 such that a head 111 on the elongated connector 104 is securely clamped against an axial end of the hub 108 when the elongated connector 104 is fastened to the propulsion device 10 in the manner shown in FIG. 1. In the illustrated example, the housing 100 has a cylinder 112 and opposing flanges 115 with holes 117 for receiving fasteners (not shown) to thereby fasten the housing 100 in place to the propulsion device 10. The clamp load produced by the connector 104 facilitates rotational (torque) loading within the mount 260a, all as is known in the art.

The resilient member 102 includes radially extending arms 110 that are radially spaced apart and fixed to an inner diameter 114 of the cylinder 112, for example by an adhesive or any other suitable form of fastening. The resilient member 102 is made of rubber or other suitable elastomeric material such that the resilient member 102 can bend/deflect with respect to the cylinder 112 under forces from the propulsion device 10 and/or marine vessel. A plurality of cavities 116 are defined between the inner diameter 114 of the cylinder 112 and the arms 110 of the resilient member 102. The cavities 116 are interdigitated amongst the plurality of arms 110. Each cavity contains electromagnetic fluid. The cavities 116 are further defined by (i.e. closed by) a not-shown covering and/or shell and/or axial end plate(s) on the cylinder 112. Any suitable covering, shell or axial end plate will suffice, as long as the covering, shell, and/or axial end plate(s) provides a fluid-tight seal on the axial ends of the cylinder 112 so as to enclose the cavities 116 and contain the electromagnetic fluid therein.

A fluid circuit 118 connects the cavities 116 to each other so that the electromagnetic fluid can flow into and between the cavities when the resilient member 102 is deformed under the external forces from the propulsion device and from the marine vessel. That is, bending or deforming of the resilient member 102 causes the geometry of each cavity 116 to change. In any given deformation, a first group of cavities 116 will decrease in size, forcing electromagnetic fluid out of those particular cavities 116. The remaining second group of cavities 116 will increase in size, creating a vacuum that allows inflow of electromagnetic fluid from the first group of cavities 116. The fluid circuit 118 facilitates the travel of electromagnetic fluid amongst the cavities 116.

The configuration of the fluid circuit 118 can vary from what is shown. As mentioned above, the cavities 116 are defined between adjacent pairs of arms 110. The fluid circuit 118 connects the respective cavities 116 so that the electromagnetic fluid is free to flow into and between the cavities 116 when the resilient member 102 is rotationally deformed under external forces from the propulsion device 10 or marine vessel.

Each cavity 116 has axially aligned sub-cavities 120 (see FIG. 7), which are separated from each other by a dividing wall 122. The fluid circuit 118 connects the axially aligned sub-cavities 120 of each cavity 116 with each other so that the electromagnetic fluid is free to flow into and between the axially aligned sub-cavities when the resilient member 102 is axially deformed by the connector 104 under external forces from the propulsion device or marine vessel.

In the illustrated example, the fluid circuit 118 comprises a plurality of fluid passages 124 in the cylinder 112. The fluid passages 124 are connected to radial holes 126 formed in the inner diameter 114 of the cylinder 112. At least one radial hole 126 is located in each of the sub-cavities 120, which allows flow of electromagnetic fluid into and between the respective cavities 116 and sub-cavities 120, as described above.

The fluid circuit 118 further includes a manifold 128 (see FIG. 6) that is remotely connected to each sub-cavity 120 via the above-described fluid passages 124 and radial holes 126. The configuration of the manifold 128 can vary and in some examples can include a conventional fluid accumulator to facilitate quick reaction to external forces on the mount 260a and/or a conventional inertia track device. The electromagnet 22 is coupled to the manifold 128. As described herein above, the electromagnet 22 is configured so that increasing the amount of electricity applied to the electromagnet 22 increases the shear strength of the electromagnetic fluid in the manifold 128, thereby decreasing elasticity of the mount 260a. That is, increasing the shear strength of the electromagnetic fluid causes the fluid to resist movement (flow) into and between the cavities 116 and sub-cavities 120 via the passages 124 and radial holes 126. This decreases the elasticity of the mount 260a. Decreasing the amount of electricity applied to the electromagnet 22 decreases the shear strength of the electromagnetic fluid in the mount 260a thereby increasing the elasticity of the mount 260a. That is, decreasing the shear strength of the electromagnetic fluid causes the fluid to more easily move (flow) into and between the cavities 116 and sub-cavities 120 via the passages 124 and radial holes 126. This increases the elasticity of the mount 260a.

In the configuration shown in FIGS. 6 and 7, the equally sized sub-cavities 120 allow for control over the mount's resistance to lateral/axial motion, as well as tipping motions. The four equally-sized cavities 116 allow for control over the mount's resistance to roll and vertical/horizontal translation motion.

FIGS. 8-11 depict a second example of a mount 260b according to the present disclosure. The mount 260b is designed to replace the mounts 16a and/or 16b shown in FIG. 1, which are disposed between connection points of the propulsion device 10 and marine vessel, including for example at the adapter plate 18 and drive shaft housing 20 of the propulsion device 10.

In FIGS. 8-11, the mount 260b has an elongated housing 200 formed from a plurality of housing sections 202, 203, 204 that are axially connected together. A plurality of electromagnets 22a, 22b, 22c are disposed in the elongated housing 200 and connected to a power source 26 (see FIG. 11) to receive electricity, as described herein above.

Resilient members 205a, 205b, 205c are disposed on the electromagnet 22 and have radially outer surfaces 206 that are fixed to the inner diameter 207 of the housing sections 202, 204 by an adhesive or any other suitable fastener. Although not shown, the interior of the housing 200 is enclosed by a covering and/or shell and/or axial end plate(s). As described herein above with respect to the example in FIGS. 6 and 7, the configuration of the covering, shell and/or axial end plate(s) can vary as long as the interior of the elongated housing 200 is sealed in a fluid tight manner to retain electromagnetic fluid therein.

The electromagnets 22a, 22b, 22c are disposed in the housing 200 and an elongated connector 208 extends through a through-bore 209 formed in the electromagnets 22a, 22b, 22c. As explained above, the clamp load produced by the connector 208 facilitates rotational (torque) loading within the mount 260c, all as is known in the art. The electromagnet 22b has a plurality of radial fins 210 are provided in the housing 200. A plurality of radial baffles 211 extends radially inwardly from the inner diameter 207 of the center-most housing section 203 and are interdigitated amongst the radial fins 210. When the resilient members 205a-205c are axially deformed via the connector 208 under external force from the propulsion device 10 or marine vessel, the electromagnetic fluid is caused to flow into and out of cavities 212 formed between the radial fins 210 and radial baffles 211, from cavity 212 to cavity 212, around the radial fins 210 and radial baffles 211. The shape and spacing of the radial fins 210 and radial baffles 211 defines the shape of the cavities 212 and the pathways for the flow of electromagnetic fluid.

The electromagnets 22a, 22c further include a plurality of axial fins 214. A plurality of axial baffles 216 extends radially inwardly from the inner diameter 207 of the outermost housing sections 202, 2014 and is interdigitated amongst the axial fins 214. When the resilient members 205 are rotationally deformed under external force from the propulsion device 10 or marine vessel, the electromagnetic fluid is free to flow in cavities 218 formed between the axial fins 214 and axial baffles 216, from cavity 218 to cavity 218, around the axial fins 214 and axial baffles 216. Thus the shape and spacing of the axial fins 214 and axial baffles 216 defines the cavities 218 and the pathways for the flow of electromagnetic fluid. When rotational motion occurs, the controller 30 and electromagnets 22a, 22c control the shear strength of the electromagnetic fluid (as described above) and opposing fins 214 and baffles 216 rotate with respect to each other and shear the electromagnetic fluid 24 there between. In this way, the shear strength of the electromagnetic fluid, as affected by the electromagnets 22a, 22c, determines the resiliency of the mount 260b to rotation.

In this example, the housing 200 advantageously is a modular housing configuration, wherein the designer can add or subtract housing sections from the housing 200 to thereby modify the elasticity of the mount 260b. In the illustrated configuration, the outermost housing sections 202, 204 control the resistance of the mount 260b to twisting and vertical/horizontal motions. The innermost housing section 203 controls the resistance of the mount 260b to axial and tipping motions.

Figure 12:
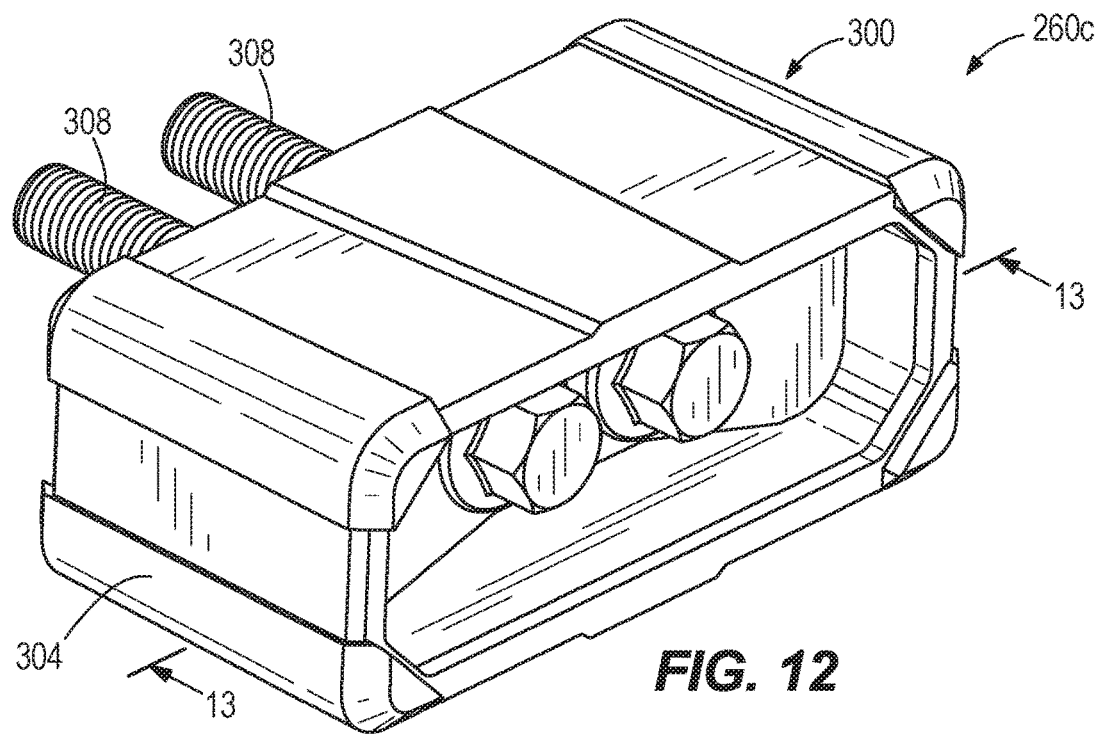
FIGS. 12-14 depict a third example of an elastic mount according to the present disclosure.
Figure 13:
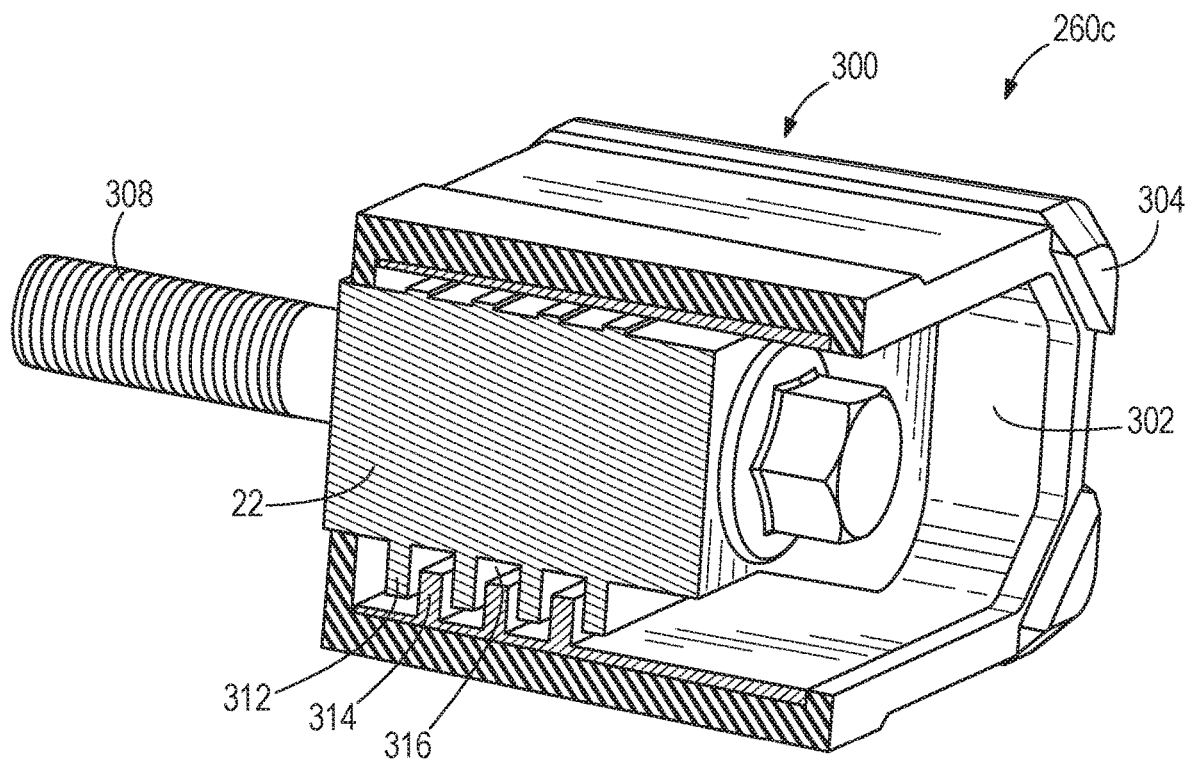
Figure 14:
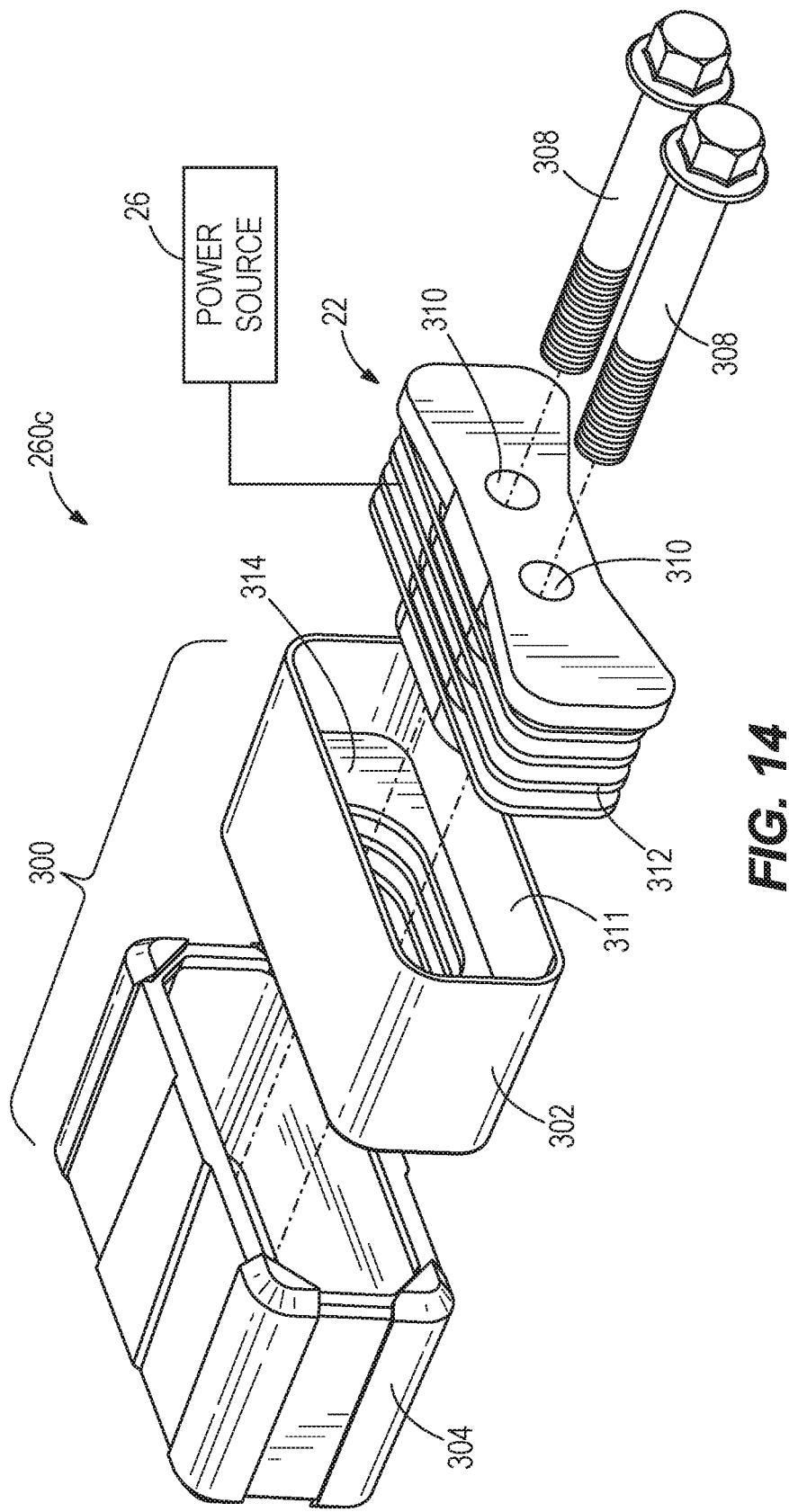

FIGS. 12-14 depict a third example of a mount 260c for supporting the propulsion device 10 with respect to the marine vessel. The mount 260c is designed to replace the mounts 16a shown in FIG. 1, which are disposed between connection points of the propulsion device 10 and marine vessel, including at the drive shaft housing 20 of the propulsion device 10.

In this example, the mount 260c includes a housing 300 that includes a metal shell 302 surrounded by a rubber cover 304. An electromagnet 22 is disposed in the housing 300. A pair of elongated connectors 308 extends though a pair of through-bores 310 in the electromagnet 22. The electromagnet 22 includes a plurality of radial fins 312. The inner diameter 311 of the metal shell 302 includes a plurality of radial baffles 314 that are interdigitated amongst the radial fins 312. Electromagnetic fluid is retained in the housing 300 and free to flow around the radial fins 312 and radial baffles 314 when the elastic mount 260c is subjected to axial forces along the elongated connectors 308 from movement of the propulsion device 10 and/or marine vessel. Cavities 316 are defined between the housing 300 and the electromagnet 306 in which the electromagnetic fluid resides. As described herein above, the electromagnet 22 is connected to a battery power source 26 and configured so that increasing an amount of electricity applied to the electromagnet 22 increases the shear strength of an electromagnetic fluid in the mount 260c thereby decreasing elasticity of the mount 260c, and so that decreasing the amount of electricity applied to the electromagnet 22 decreases the shear strength of the electromagnetic fluid in the mount 260c thereby increasing the elasticity of the mount 260c.

Through research and experimentation, the present inventors have recognized that certain hydrodynamic handling issues are induced when a vessel is turning, usually at medium or high speeds, which creates a wobble that is transmitted into the marine vessel. This "wobble" shakes the marine vessel and is, at the very least, a nuisance, and can even become significant enough to cause safety concerns. The inventors have recognized that such hydrodynamic handling issues are a complex problem resulting from the relationship between the vessel hull design and the center of gravity of the vessel, the center of the gravity of the propulsion device, and the center of pressure on the gear case. The problem occurs on certain boats, at certain speeds, and at certain steering angles, where a side loading is imparted on one or more propulsion devices when entering into a turn, which then side loads the mounts and causes an imbalance of pressures on the marine vessel 2.

Based upon recognition of the foregoing hydrodynamic handling problem, the present inventors developed the disclosed systems and methods that automatically adapt the amount of electricity applied to one or more of the electromagnets in the mounting system when a marine vessel is turning and a predetermined threshold oscillation is detected in the marine vessel and/or in one or more of the propulsion devices 10. Namely, the system and method engage a control strategy to limit or counteract the hydrodynamic handling issue when a set of threshold conditions are met, including when the marine vessel is at or above a vessel speed threshold and is turning at a threshold a turn angle, and when a threshold oscillation is measured by a motion sensor in at least one of the propulsion devices 10 or one the marine vessel 2.

FIG. 16 depicts one embodiment where a marine vessel 2 is equipped with a propulsion system involving three propulsion devices 10, 10', 10'', which in the depicted example are outboard motors. Each propulsion device 10, 10', 10'' is equipped with a local engine control module (ECM) 30b, 30b', 30b'' in communication with a helm control module (HCM) 30a housed on the marine vessel. Each ECM 30b, 30b', 30b'' is equipped with a respective motion sensor 57, 57', 57'' that measures motion of the marine vessel. Similarly, the system 28 may include a vessel motion sensor on the marine vessel 2 that senses a position and/or angular velocity or acceleration. As described above, the motion sensors 57, 54 may include one or more accelerometers, gyroscopes, and/or magnetometers. The motion sensors 57 may be placed anywhere on the respective propulsion device 10. In the depicted example, the motion sensors 57 are provided on or in association with the respective ECMs 30b. Similarly, the vessel motion sensor 54 may be provided anywhere on the marine vessel 2, and in the depicted embodiment is provided on or in association with the HCM 30a.

Figure 17A:
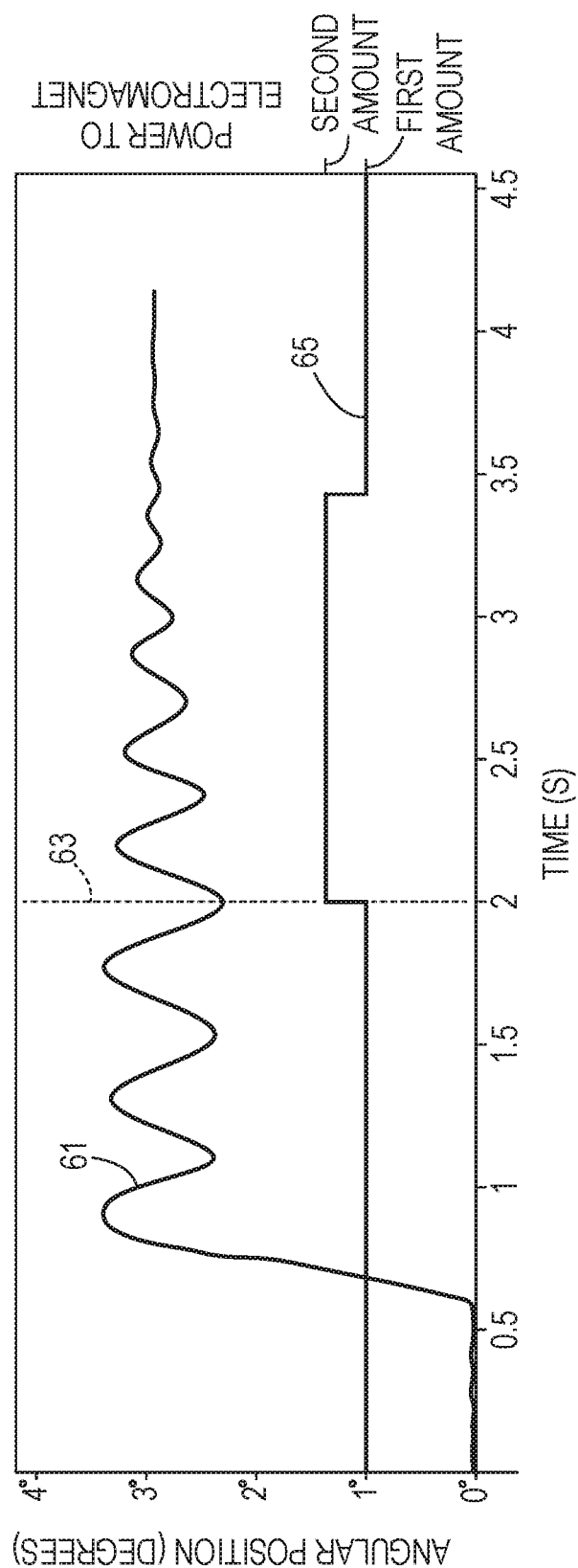
FIGS. 17A and 17B depict oscillation measurements on a propulsion device and exemplary corresponding power adjustments to an electromagnet changing elasticity of an elastic mount.

FIG. 17A provides a graph depicting output of a motion sensor 57, 54 at line 61, which in the depicted example is angular position measured in degrees. In the exemplary representative scenario, the angular position measurements are received by the controller 30, such as by the HCM 30a portion thereof. The angular position measurement represented at line 61 could be from either a motion sensor 57 on a propulsion device 10 or from a vessel motion sensor 54 on the marine vessel 2. The controller 30 processes the angular position measurement to detect the presence of a threshold oscillation. For example, the threshold oscillation may be a predetermined threshold number of oscillation cycles detected by the respective motion sensor 57, 54 within a predetermined time. For instance, and oscillation cycle may be based on peak detection in the angular position measurement. In certain embodiments, the controller 30 may also access the magnitude of the oscillations, and the threshold oscillation detection may further involve detection of a threshold magnitude.

In the example of FIG. 17A, the threshold oscillation is detected at time point 63 after three oscillation cycles. Upon detection of the threshold oscillation, assuming that the vessel speed is sufficiently high and the marine vessel is being turned at a threshold turn angle or greater, the amount of electricity applied to the electromagnet is increased to change the elasticity of at least one elastic mount attaching a propulsion device 10 to the marine vessel 2. Line 65 represents the power to the electromagnet 22, which is applied at a first amount until detection of the threshold oscillation, at which point it is increased to a second power amount. For example, the second power amount may be a predetermined power increase above the first power amount. In another example, the second power amount may be a predetermined power value, such as a maximum power rating for the respective elastic mount 160. In other examples, the second power amount may be a percentage increase over the first power amount, or may be some other power value that is greater than the first power amount. In various embodiments, the electricity, or power, increase may be effectuated as an increase in current or an increase in voltage applied to the electromagnet in order to decrease the elasticity of the elastic mount, which will have the effect of increasing resistance to and reducing the oscillation of the propulsion device on the marine vessel. In still other embodiments, the second amount of electricity may be an amount determined based on the magnitude of the oscillation.

Figure 17B:
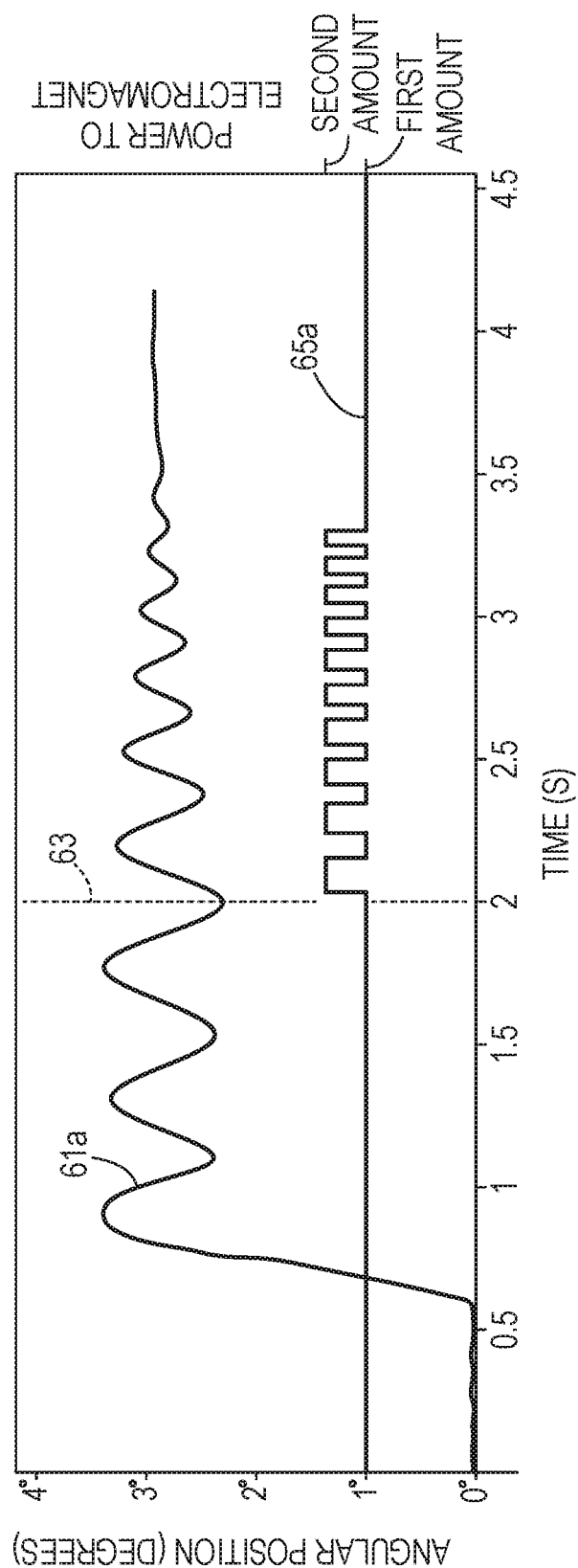

In certain embodiments, the power increase may be applied based on the frequency and/or magnitude of the measured oscillation. For example, FIG. 17B depicts an embodiment where the power increase is applied strategically to resist oscillation but also avoid transferring motion from the respective propulsion device 10 to the marine vessel 2 as much as possible in order to provide a better experience for the user. In FIG. 17B, line 61a represents the angular position measurement by the motion sensor 57 on the propulsion device 10, and line 65a represents the power provided to at least one elastic mount 160 in the mount system 29 supporting the propulsion device 10 on the transom 105 of the marine vessel 2. The power increase is provided strategically to resist the oscillation movement of the propulsion device 10, but the power increase is removed at the oscillation peaks in order to provide better elasticity and absorption of the movement of the propulsion device by the elastic mount 160, and thus to reduce the transfer of motion to the marine vessel 2 at the oscillation peak. Accordingly, the power increase is applied but is briefly removed so that the lesser amount of power (i.e., the first power amount) is applied at the oscillation peaks.

In the depicted embodiment, the second power amount is applied until the threshold oscillation of the propulsion device or the marine vessel is no longer detected. In other embodiments, the second power amount may be maintained for a predetermined time period following determination that the oscillation is no longer present. For example, the determination that the oscillation is no longer present may include assessment that the change in angular position is less than a predetermined amount and/or that the magnitude of the previously-detected oscillations is less than a predetermined magnitude. In still other embodiments, the second power amount may be applied for a predetermined time following detection of the threshold oscillation, and upon expiration of the predetermined time the power increase may be removed. If the threshold oscillation is detected again by the controller 30, then the power increase may be reapplied, and in certain embodiments the predetermined amount of time of application may be successively increased.

Returning to FIG. 16, each mounting system 29, 29', and 29", includes two electromagnetic elastic mounts 160a and 160b. In various embodiments, each mounting system 29 includes any number of one or more elastic mounts 160. For example, the elastic mounts 160 may be provided in the exemplary mounting system depicted in FIG. 1, which includes four mounts 16a, 16b. As described above, each elastic mount 160a, 160b contains an electromagnetic fluid and an electromagnet arranged such that changes in the power applied to the electromagnet will adjust the sheer strength of the electromagnetic fluid and thereby adjust the elasticity of the elastic mount 160a, 160b. Each of the elastic mounts 160a, 160b in each mount system 29 may be controlled separately or simultaneously and identically. For example, the power adjustments may be applied to only one of the elastic mounts 160a, 160b, or the power adjustments to the respective elastic mounts may be different in magnitude or timing. For example, the power increases discussed above may be applied strategically to the elastic mounts in order to counteract the oscillation of the propulsion device 10, such as alternating or otherwise varying the timing at which the power increases are supplied to each of the elastic mounts 160a, 160b in coordination with the frequency and/or magnitude of the oscillation.

Similarly, the respective mount system 29, 29', 29" may be controlled differently from one another. For example, if oscillation is detected in only one of the propulsion devices 10, 10', 10", then only the respective mount system 29, 29', 29" may be firmed up by applying a corresponding power increase. Similarly, if the respective mount systems 29, 29', 29" may be controlled based on the magnitude and/or frequency of oscillation measured in the respective propulsion device 10, 10', 10", which could vary between propulsion devices and would result in different magnitude and timing of power increases to the one or more elastic mounts 160a, 160b in each of the respective mount systems 29, 29', 29".

In certain embodiments, the electricity supplied to the mount systems 29, 29', 29" may be varied based on a vessel angle of the marine vessel 2 as measured by the vessel motion sensor 54. For example, a vessel angle over a threshold vessel angle when the marine vessel 2 is travelling at or above a threshold vessel speed indicates that the marine vessel is likely engaged in a banked turn. On certain marine vessels having multiple propulsion devices, one or more of the outer propulsion devices may lift out of the water during a banked turn. On such a system, it may be desirable to turn off or disable the disclosed control strategy to avoid firming up the mount system 29 for a propulsion device that is out of the water. The propulsion device 10 that is out of the water is likely to see sudden changes in load and increased oscillations as it exits and enters the water, and it may be desirable to avoid firming up the mount system 29 so that the mount system 29 can absorb more of the propulsion device 10 motion and transfer less to the marine vessel 2. Thus, in certain embodiments, the controller 30 may operate to apply no more than the first amount of electricity to the electromagnet(s) 22 of certain mount systems 29 when the vessel angle of the marine vessel exceeds the threshold vessel angle indicating that the respective propulsion device 10 is on the high side of the marine vessel 2 and is likely out of the water. Such a strategy may be employed on marine vessels having two or more propulsion devices 10 situated on either side of a center line of the marine vessel. In certain embodiments, such strategies may be employed to control the mount systems 29 for the outer-most propulsion devices 10 in propulsion system involving three or more propulsion devices 10.

FIGS. 18-21 depict various embodiments of methods 400, 500, 600, or portions thereof, for controlling an elastic mount. In FIG. 18, a method 400 of controlling an elastic mount includes receiving a vessel indicator at step 404 while a first power amount is applied to the electromagnet 22 of a respective elastic mount 160. For example, the first power amount may be an amount dictated by a map 60, such as a map correlating a condition of the system to a power amount that is used for controlling the elastic mount 160 under normal operating conditions. The vessel speed indicator received at step 404 may be, for example, a vessel speed measured by a vessel speed sensor 41, examples of which are described herein, or a GPS speed determined by a GPS device 43 as described above. For example, the speed threshold may be set at some percentage of the vessel's speed capability. To provide just one example, the speed threshold could be 8% of the maximum speed for that particular marine vessel 2 and propulsion system. If the vessel speed indicator is greater than the speed threshold at step 406, then the control algorithm progresses to step 408 and 410 where the turn angle indicator is received and compared to a threshold angle. For example, the turn angle indicator may be one of a steering angle of the respective propulsion device sensed by the steering angle sensor 50 associated with the steering actuator for the propulsion device 10. In another example, the turn angle may be a steering wheel position measured by a steering wheel position sensor 51 associated with the steering wheel 31 on the marine vessel 2. The threshold angle is an angle indicating a turn, or at least initiation of a turn, of the marine vessel. To provide just one example, the threshold angle may be 3 degrees away from the centered, straight ahead position.

Once the conditions are such that the vessel speed indictor exceeds the speed threshold at step 406 and the turn angle exceeds the threshold angle at step 410 the motion of the propulsion device is measured at step 412 and compared to a threshold oscillation at step 414. If the threshold oscillation is also detected, in addition to the threshold turn angle and speed threshold, then a control strategy is implemented where the power applied to the electromagnet 22 is increased in order to provide a firmer elastic mount 160 in order to reduce or counteract the detected oscillation.

Figure 20:
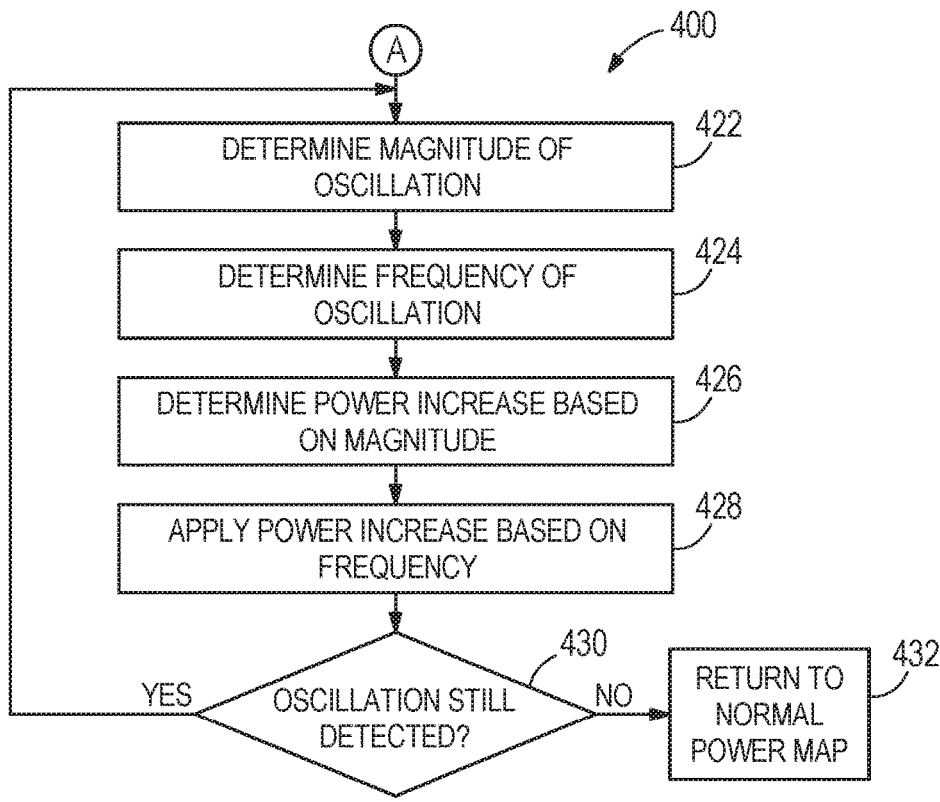
Figure 21:
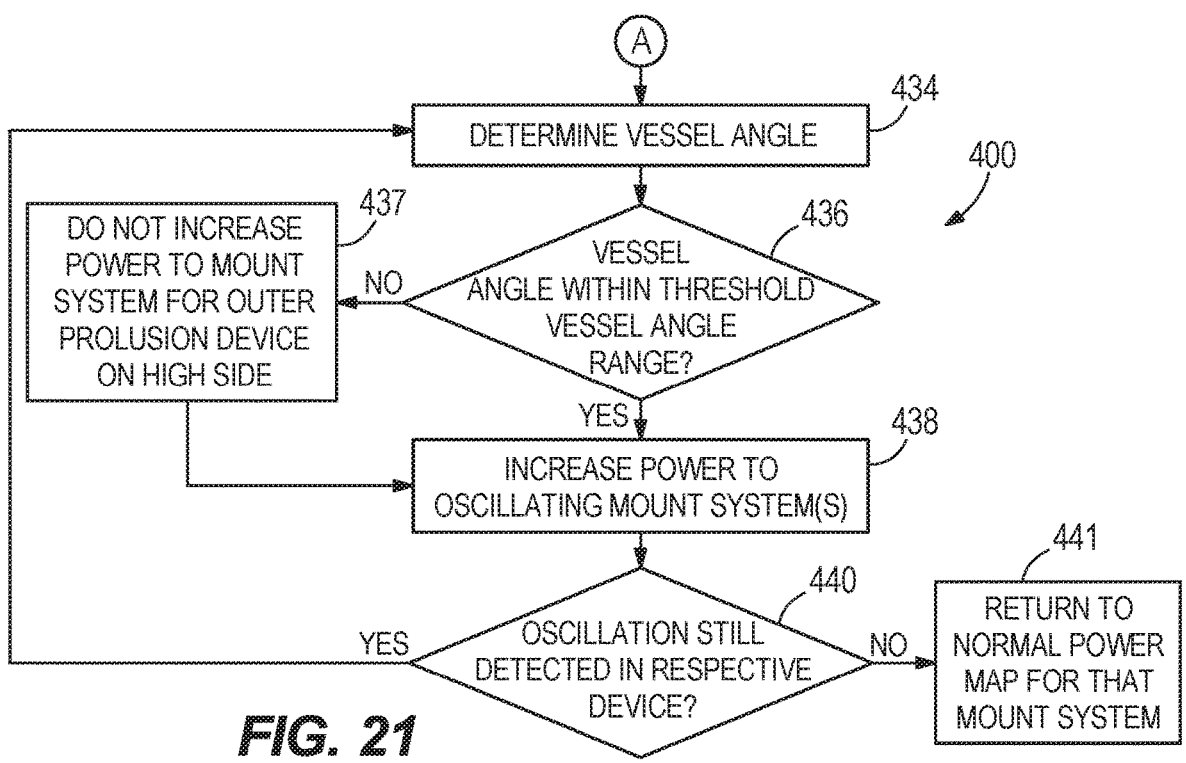

FIGS. 19-21 depict exemplary embodiments of methods for adjusting the elasticity of the mount. In FIG. 19, power is increased at step 416, such as increasing the power applied to the electromagnet 22 by a predetermined amount or to a predetermined power level. At step 418 the system checks whether the oscillation is still detected. The power increase is maintained at step 420 until the oscillation is no longer detected, at which point step 419 is executed to return the power level to the value dictated by the base power map 60 configured to provide control during a range of normal operating conditions. In other embodiments, the increased power may be maintained for a predetermined amount of time at which point the system may recheck whether the conditions set out at FIG. 18 are still present and, if so, reapply or continue maintenance of the power increase.

FIG. 20 depicts another embodiment of method steps for determining and implementing the power increase. The magnitude of oscillation is determined at step 422 and the frequency of oscillation is determined at step 424. The power increase amount is then determined at step 426 based on the magnitude of the oscillation. For example, the power increase may be provided by a map 60 correlating the oscillation magnitude with a power increase amount. The power increase may then be applied at step 428 based on the frequency, such as to time the application of the power increase to avoid the oscillation peaks, as described above with respect to FIG. 16B. If the oscillation is still detected, the magnitude and frequency of the oscillation may be re-determined and the power increase amount and application frequency adjusted accordingly. Thereby, the power increase will phase out as the magnitude of the oscillation decreases. Likewise, the frequency at which the power increase is pulsed will remain timed with the frequency of the oscillation. Once the oscillation is no longer detected at step 430, the system returns to normal power control at step 432, such as in accordance with a base map 60 configured for a range of normal operating conditions.

FIG. 21 depicts another embodiment, which is for a multi-propulsion device 10 propulsion system wherein a vessel motion sensor 54 measures an angle of the marine vessel. The vessel angle is determined at step 434. If the vessel angle is within a threshold vessel angle range at step 436, then all propulsion devices 10 are assumed to be in the water and the power is increased at step 438 to mount systems 29 associated with propulsion devices that meet the conditions depicted at FIG. 18. In certain embodiments, elastic mounts 160a, 160b may be controlled separately such that the power increase is applied differently to each of the elastic mounts 160a, 160b. If the vessel angle is outside of the vessel angle range, then the power increase is not applied to or removed from any elastic mount 160 in a mount system 29 associated with an outer propulsion device on the high side of the marine vessel (dictated by the direction of the vessel angle), because that propulsion device 10 is likely not engaged in the water. So long as the threshold requirements set forth at FIG. 18 are maintained, then the power increase is maintained until oscillation is no longer detected at step 440 in the respective propulsion device, at which time the power control returns to the normal power map for that particular mount system 29 or individual elastic mount 160.

The inventors have further recognized that control of the elastic mount(s) 160 to adjust the elasticity of the mount system 29 can be utilized to address and minimize problems related to "hooking," where the throttle demand sent to a propulsion device 10 is suddenly reduced and the marine vessel slows down rapidly. In such a rapid deceleration scenario, the forces exerted on the propulsion device 10, such as an outboard, are such that the marine vessel 2 turns as the vessel slows down and comes off of plane. This involuntary turn can be problematic, especially in tight quarters where precise vessel control is important.

Through their experimentation and research, the present inventors have recognized that increasing the electricity applied to the elastic mount(s) 160 during a rapid deceleration of the marine vessel 2 can reduce the problem of hooking. Namely, if the conditions are such that hooking is likely, the controller 30 may increase the power applied to all of the elastic mounts 160 on the propulsion device 10, thus decreasing the elasticity of that elastic mount and providing a firmer support of the propulsion device 10 on the marine vessel 2, in order to reduce or avoid hooking.

Figure 22:
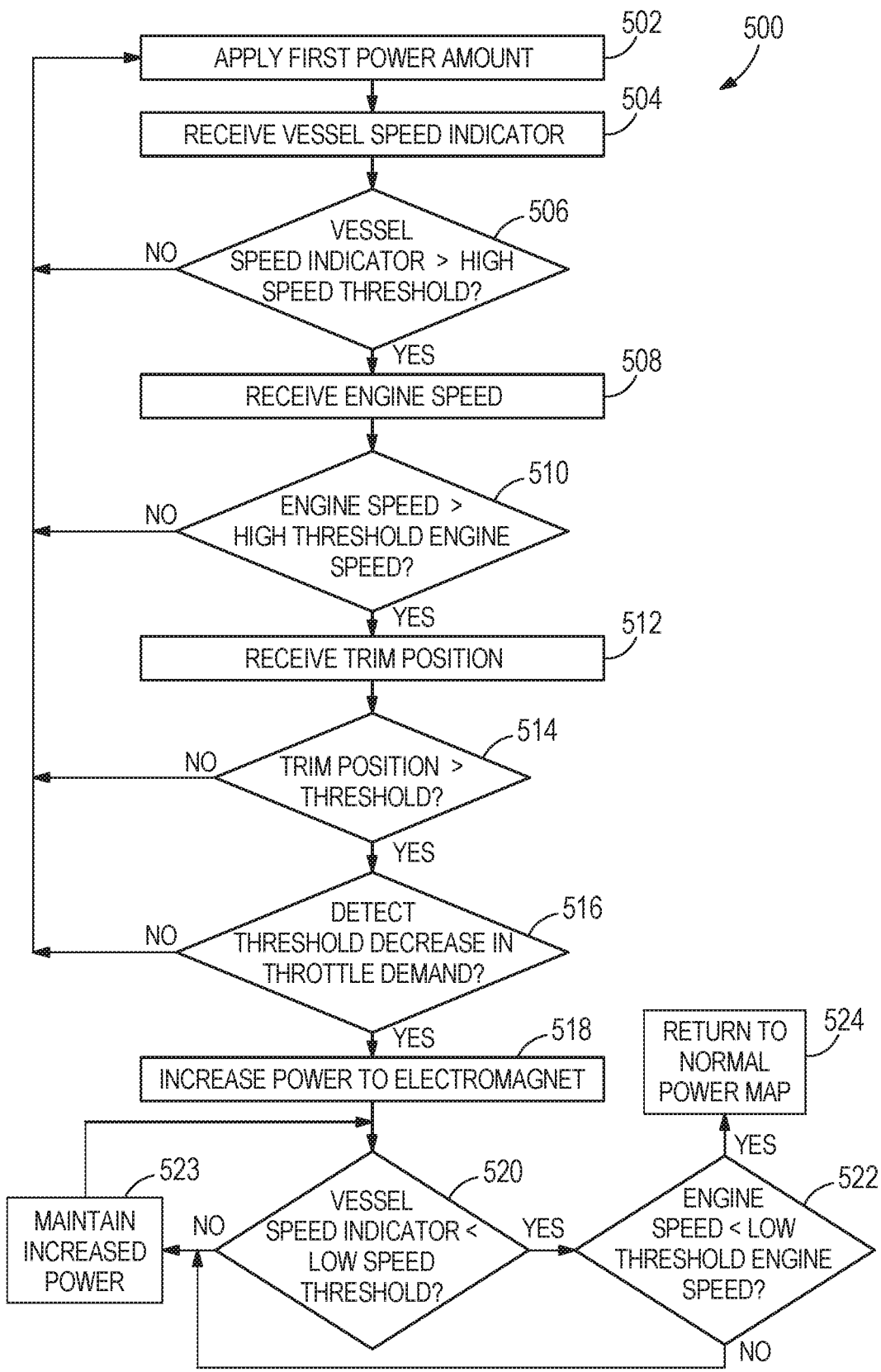

FIG. 22 depicts one exemplary method 500 of controlling elastic mounts 160 in order to prevent or reduce hooking. A first power amount is applied to the respective elastic mounts 160 at step 502, such as according to a base power map 60 configured to address normal operating conditions. A vessel speed indicator is received at step 504 and compared to a high speed threshold at step 506. In certain embodiments, the high speed threshold may be a certain percentage of maximum vessel speed capability. To provide just one example, the high speed threshold may be 50% of the vessel's maximum speed capability. In another example, the high speed threshold may be the planing speed for the marine vessel. If the vessel speed exceeds the high speed threshold, the system may also check the engine speed at steps 508 and 510 to determine whether the engine speed exceeds a high threshold engine speed. In other embodiments, the engine speed check may be eliminated, and the strategy may be engaged based on the vessel speed alone. A trim position is received at step 512, and step 514 is executed to determine whether the trim position exceeds a trimmed out threshold indicating that the marine vessel is on plane. As long as the vessel speed and/or engine speed, as well as the trim position, meets the respective threshold, then the system waits for a sudden decrease in throttle demand (sometimes referred to as a "throttle chop") that could create the conditions to cause hooking. For example, the threshold decrease in throttle demand may be based on input from an engine load sensor 48 sensing a threshold decrease in engine load. In other embodiments, the threshold decrease in throttle demand may be based on input from a throttle position sensor 49 sensing a threshold change in throttle positon, such as a threshold change in the position of a throttle control lever 39 on the marine vessel 2. To provide just one example, the threshold decrease in throttle demand may be a 50% decrease in throttle control lever 39 position as measured by the throttle position sensor 49. In other embodiments, the threshold decrease in throttle demand may be higher or lower than that value, and may be calibrated for a particular marine vessel 2 and propulsion system.

Once the threshold decrease in throttle demand is detected, the controller 30 increases the power to the electromagnets 22 in one or more elastic mounts 160 at step 518. In one embodiment, the increased power is applied across all elastic mounts in order to prevent the effects of hooking as much as possible. The power increase is maintained at step 523 until the boat speed indicator is below a low boat speed threshold at step 520 and/or the engine speed is below a low threshold engine speed at step 522. In certain examples, the power increase may be stopped upon detection of either the low boat speed threshold or the low threshold engine speed. In other embodiments, such as the depicted example, both conditions are required. To provide just one example, the low speed threshold may be 10 miles per hour, or any other speed at which the risk of hooking is sufficiently minimized. Similarly, the low threshold engine speed may be 1,000 RPM, or some other engine speed indicating that the vessel has slowed enough that the risk of hooking is negligible or zero. Once the lower threshold conditions are met, then the power control returns to the normal power map at step 524.

Through their research and experimentation in the relevant field, the inventors also realized that the elastic mount (s) 160 can be controlled to improve rapid acceleration of a marine vessel, such as to improve the 0 to 20 miles per hour acceleration time in a "hole shot" maneuver. Namely, the inventors have recognized that optimum acceleration, such as from idle or from a very low speed, is assisted by maximally trimming in the propulsion device 10. Holding the propulsion device (s) 10 at a trimmed-in angle, where the gear case of the propulsion device 10 is tucked in closer to the marine vessel, creates a lift factor that helps the vessel come up out of the water more quickly resulting in a faster initial acceleration of the vessel, such as from 0 to 20 miles per hour. For example, existing marine vessel trim arrangements for outboards often permit a maximum trim-in positon of approximately 4 degrees (see e.g., FIG. 15B). The inventors have recognized that softening the mount systems 29 supporting the propulsion devices 10 on the marine vessel can allow for additional trim-in, such as another 2 degrees or 3 degrees of trim-in toward the marine vessel from the normal fully trimmed-in position. Thus, the control system may be configured such that when conditions indicate a rapid demand increase, the power supplied to the elastic mounts 160 may be decreased in order to increase the elasticity of the mounts 160 and allow for an increased trimmed-in angle (i.e., beyond the maximum trim-in provided for by the trim system).

Figure 23:
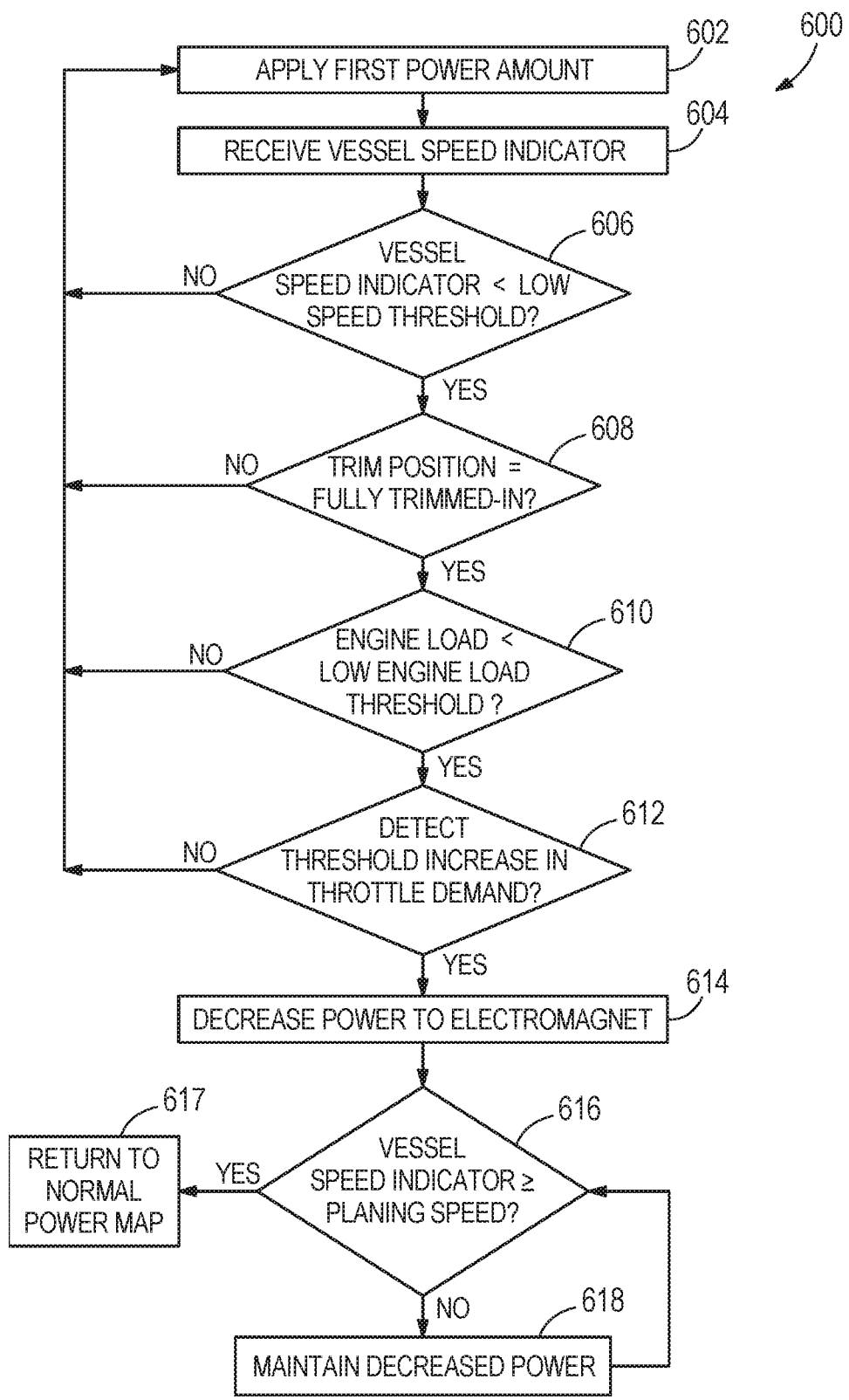

FIG. 23 exhibits one embodiment of a method 600 for controlling an elastic mount in order to provide improved initial vessel acceleration, such as between 0 and 20 mph. The first power amount is applied at step 602, such as according to the map 60 for controlling the power to the electromagnets under normal operating conditions. The vessel speed indicator is received at step 604 and compared to a low speed threshold at step 606. For example, the low speed threshold may be very low, such as below 5 mph. In certain embodiments, engine speed may also be examined to determine whether engine speed is below a low threshold engine speed, such as below 1,000 RPM, or even idle engine speed or within a threshold thereof. The trim position is examined at step 608, such as the value outputted by the trim position sensor 52 or the commanded trim position from a user or from the HCM 30a.

At step 608, if the trim position is equal to the fully trimmed-in position, or max trim-in provided by the trim system, then the system looks for a threshold increase in throttle demand at steps 610 and 612. In certain embodiments, the throttle demand may be based on engine load. In such embodiments, the system may further determine whether the engine load is below an engine load threshold, and then look to detect a threshold change in engine load within a predetermined time. In other embodiments, the threshold increase in throttle demand may be based on output of the throttle position sensor 49, similar to that described in embodiments above. If the threshold increase in throttle demand is detected at step 612 then the power to the electromagnets 22 in one or more of the elastic mounts 160 is decreased at step 614. For example, the power may be decreased by a predetermined amount or decreased to a predetermined power level. In certain embodiments, the power to the electromagnets 22 associated with all of the elastic mounts 160 in the mount systems 29 on the marine vessel 2 may be decreased to the same predetermined decreased power level or decreased by the same predetermined amount.

The vessel speed indicator is monitored at step 616 such that the decreased power level is maintained at step 618 until the vessel speed exceeds a predetermined high speed threshold, such as the planing speed for the marine vessel. In the depicted embodiment, the power level is returned to that indicated by the base power map 60 at step 617 once the vessel speed indicator is greater than or equal to planing speed. In other embodiments, the power may be slowly increased over time as the vessel speed increases above a threshold vessel speed, so as to phase out the increased elasticity of the elastic mounts 160 and mount systems 29 as the vessel gets up on plane.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for controlling an elastic mount configured to support a propulsion device with respect to a marine vessel, wherein the elastic mount contains an electromagnetic fluid and an electromagnet and is configured such that adjusting an amount of electricity applied to the electromagnet changes the shear strength of the electromagnetic fluid in the elastic mount and thereby controls elasticity of the elastic mount, the method comprising:
    applying a first amount of electricity to the electromagnet to produce an initial elasticity of the elastic mount;
    determining that a vessel speed indicator exceeds a speed threshold;
    determining that a turn angle indicator is greater than an angle threshold;
    measuring an oscillation of the propulsion device or the marine vessel with a motion sensor;
    determining that the oscillation of the propulsion device exceeds a threshold oscillation; and
    adjusting the amount of electricity applied to the electromagnet to change the elasticity of the elastic mount so as to reduce the oscillation.

2. The method of claim 1, wherein adjusting the amount of electricity applied to the electromagnet includes either increasing the amount of electricity applied to the electromagnet by a predetermined amount upon detecting the threshold oscillation, or increasing the amount of electricity applied to the electromagnet to a predetermined value upon detecting the threshold oscillation.

3. The method of claim 1, wherein the motion sensor is located on the propulsion device and the oscillation is an oscillation of the propulsion device.

4. The method of claim 3, further comprising periodically removing the electricity adjustment applied to the electromagnet based on the oscillation of the propulsion device so as to apply the first amount of electricity at oscillation peaks of the propulsion device.

5. The method of claim 1, wherein the threshold oscillation is a threshold number of oscillation cycles in the motion sensor output within a predetermined time.

6. The method of claim 5, wherein the motion sensor includes at least one of an accelerometer and a gyroscope located on the marine vessel, wherein the oscillation is an oscillation of the marine vessel.

7. The method of claim 6, further comprising determining at least one of a magnitude of oscillation of the propulsion device and a frequency of oscillation of the propulsion device, and wherein the amount of electricity applied to the electromagnet is adjusted based on the magnitude of oscillation and/or the frequency of oscillation; and timing an electricity increase based on the frequency of oscillation.

8. The method of claim 1, further comprising:
    measuring a vessel angle of the marine vessel with a vessel motion sensor;
    removing the electricity adjustment so as to apply no more than the first amount of electricity to the electromagnet when the vessel angle of the marine vessel exceeds a threshold vessel angle.

9. The method of claim 1, removing the electricity adjustment so as to apply the first amount of electricity to the electromagnet upon determining that the oscillation of the propulsion device is less than the threshold oscillation.

10. The method of claim 1, wherein the vessel speed indicator is one of a vessel speed measured by a speed sensor on the marine vessel and a GPS speed determined by a GPS device on the marine vessel.

11. The method of claim 1, wherein the turn angle indicator is one of a steering angle of the propulsion device sensed by a steering angle sensor associated with a steering actuator for the propulsion device and a steering wheel position measured by a steering wheel position sensor.

12. A system for supporting a propulsion device with respect to a marine vessel, the system comprising:
    an elastic mount configured to support the propulsion device with respect to the marine vessel, wherein the elastic mount contains an electromagnetic fluid;
    an electromagnet configured so that increasing an amount of electricity applied thereto increases the shear strength of the electromagnetic fluid in the elastic mount and thereby decreases elasticity of the elastic mount, and further configured so that decreasing the amount of electricity applied to the electromagnet decreases the shear strength of the electromagnetic fluid in the elastic mount and thereby increases the elasticity of the elastic mount;
    a motion sensor on the propulsion device configured to measure an oscillation of the propulsion device; and
    a controller configured to:
        apply a first amount of electricity to the electromagnet to produce an initial elasticity of the elastic mount;
        determine that a vessel speed indicator exceeds a speed threshold;
        determine that a turn angle indicator is greater than an angle threshold;
        determine that the oscillation of the propulsion device exceeds a threshold oscillation; and
        increase the amount of electricity applied to the electromagnet to decrease the elasticity of the elastic mount so as to reduce the oscillation of the propulsion device.

13. The system of claim 12, wherein the electricity increase applied to the electromagnet is a predetermined increase added to the first amount of electricity upon detection of the threshold oscillation.

14. The system of claim 12, wherein the electricity increase is a predetermined amount of electricity applied to the electromagnet upon detecting the threshold oscillation, wherein the predetermined amount of electricity is greater than the first amount of electricity.

15. The system of claim 12, wherein the threshold oscillation is a threshold number of oscillation cycles in the motion sensor output within a predetermined time.

16. The system of claim 12, further comprising periodically removing the electricity adjustment applied to the electromagnet based on the oscillation of the propulsion device so as to apply the first amount of electricity at oscillation peaks of the propulsion device.

17. The system of claim 12, wherein the controller is further configured to remove the electricity increase so as to apply the first amount of electricity to the electromagnet upon determining that the oscillation of the propulsion device is less than the threshold oscillation.

18. A propulsion system for a marine vessel, the propulsion system comprising:
- a first propulsion device supported on the marine vessel by a first mount system comprising at least one elastic mount;
- a second propulsion device supported on the marine vessel by a second mount system comprising at least one elastic mount;
- wherein each elastic mount contains an electromagnetic fluid and an electromagnet and is configured such that adjusting an amount of electricity applied to the electromagnet changes the shear strength of the electromagnetic fluid in the elastic mount and thereby controls elasticity of the elastic mount;
- a first motion sensor on the first propulsion device configured to measure an oscillation of the first propulsion device;
- a second motion sensor on the second propulsion device configured to measure an oscillation of the second propulsion device;
- a controller configured to:
  - apply a first amount of electricity to the electromagnet in at least one elastic mount in the first mount system and the electromagnet in at least one elastic mount in the second mount system produce an initial elasticity of the respective elastic mounts;
  - determine that a vessel speed indicator exceeds a speed threshold;
  - determine that a turn angle indicator is greater than an angle threshold;
  - increase the amount of electricity applied to one or more electromagnets in the first mount system upon detecting that the oscillation of the first propulsion device exceeds a first threshold oscillation; and
  - increase the amount of electricity applied to one or more electromagnets in the second mount system upon detecting that the oscillation of the second propulsion device exceeds a second threshold oscillation.

19. The system of claim 18, wherein the first threshold oscillation and the second threshold oscillation are based on at least one of a position of the propulsion device with respect to the marine vessel and a vessel angle of the marine vessel.

20. The system of claim 18, further comprising, for at least one of the first mount system and the second mount system, determining that the vessel angle of the marine vessel is within a threshold vessel angle range prior to increasing the amount of electricity applied to one or more electromagnets in the respective mount system.

* * * * *